United States Patent
Wahlberg

[15] 3,705,384
[45] Dec. 5, 1972

[54] BUSINESS TRANSACTION APPARATUS

[72] Inventor: Eric C. Wahlberg, 32 Eighth St., Stamford, Conn. 06905

[22] Filed: Aug. 10, 1971

[21] Appl. No.: 170,520

Related U.S. Application Data

[63] Continuation-in-part of Ser. No. 884,620, Dec. 12, 1969, abandoned.

[52] U.S. Cl..........340/149, 194/DIG. 6, 194/DIG. 8, 194/DIG. 9, 235/61.7 B, 340/147 A, 340/153
[51] Int. Cl..............................G07f 7/02, H04q 1/00
[58] Field of Search................340/149, 153, 147 A; 235/61.7 B, 61.9; 194/DIG. 6, DIG. 7, DIG. 8, DIG. 9, DIG.14

[56] References Cited

UNITED STATES PATENTS

| | | | |
|---|---|---|---|
| 2,970,877 | 2/1961 | Parsons | 235/61.7 B |
| 3,039,582 | 6/1962 | Simjian | 235/61.7 B |
| 3,039,686 | 6/1962 | Bell | 235/151.33 |
| 3,290,491 | 12/1966 | Wahlberg | 235/151.33 X |
| 3,330,947 | 7/1967 | Alpert | 235/92 |
| 3,340,978 | 9/1967 | Haville | 340/149 |
| 3,356,992 | 12/1967 | Ptacek et al. | 340/149 |
| 3,445,633 | 5/1969 | Ratner | 340/149 |
| 3,532,865 | 10/1970 | Karp | 235/151.33 |
| 3,564,132 | 2/1971 | Baker | 340/149 X |
| 3,622,995 | 11/1971 | Dilks et al. | 340/149 X |

Primary Examiner—Donald J. Yusko
Attorney—Arnold B. Christen et al.

[57] ABSTRACT

A multiple transaction business machine is provided which includes means for selecting a plurality of transactions, totaling the cost of such transactions and determining the value of payment tendered in satisfaction of the cost of the transactions by payment evaluating means receiving legal tender, credit media and negotiable instruments from the purchaser in tender of satisfaction of the cost of the transactions selected, as well as means for validating the credit media and negotiable instruments presented and means for validating the identity of the purchaser. The machine issues tickets and the like in response to preselection of various modes of transportation, package mailing and handling, etc. A remote data link for the purpose of credit availability verification and purchaser identity is also provided together with remote control, intercom and live identification media.

14 Claims, 16 Drawing Figures

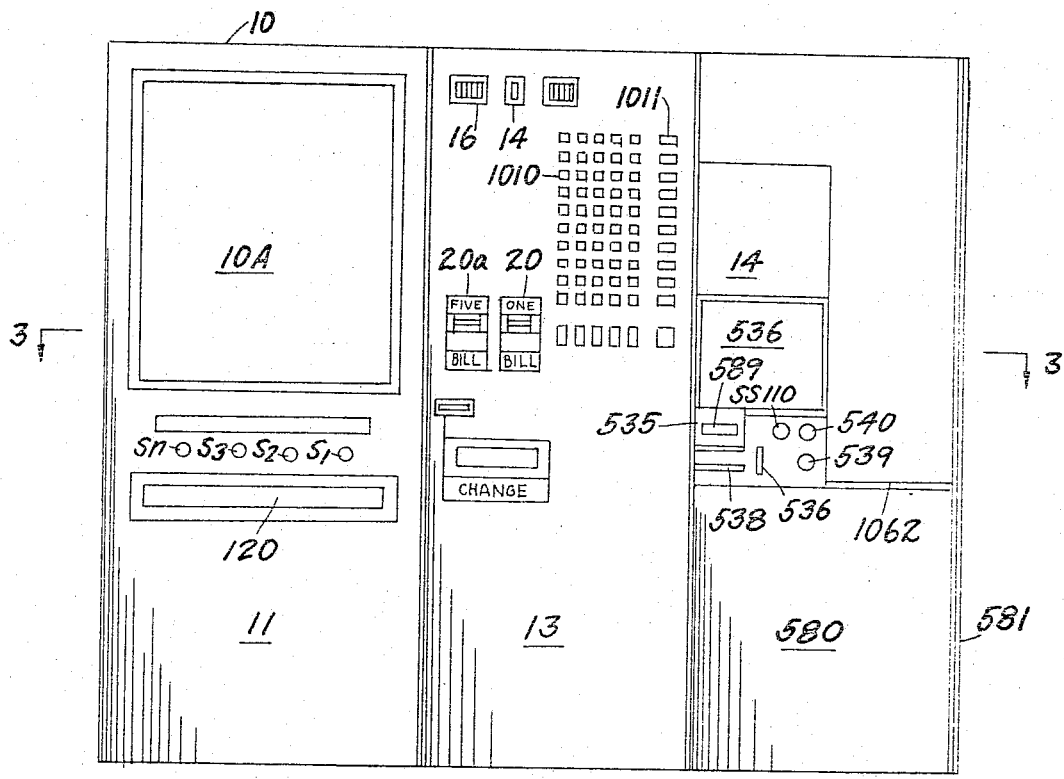
Fig 1
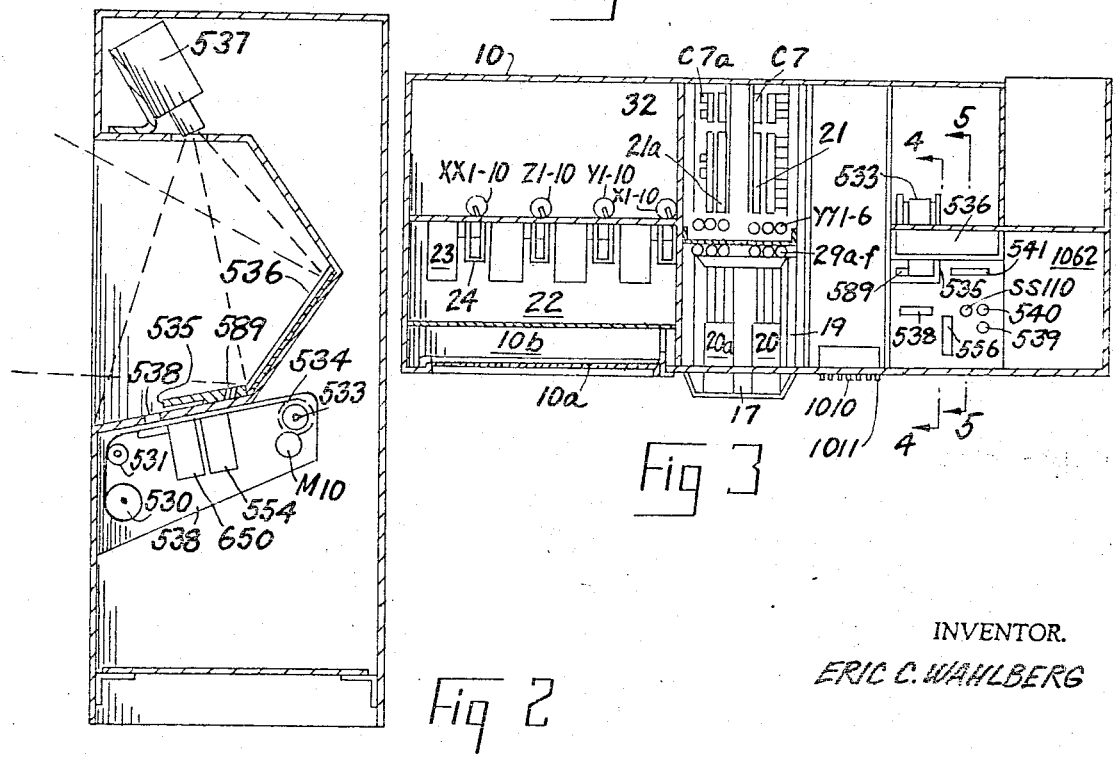
Fig 2
Fig 3
INVENTOR.
ERIC C. WAHLBERG

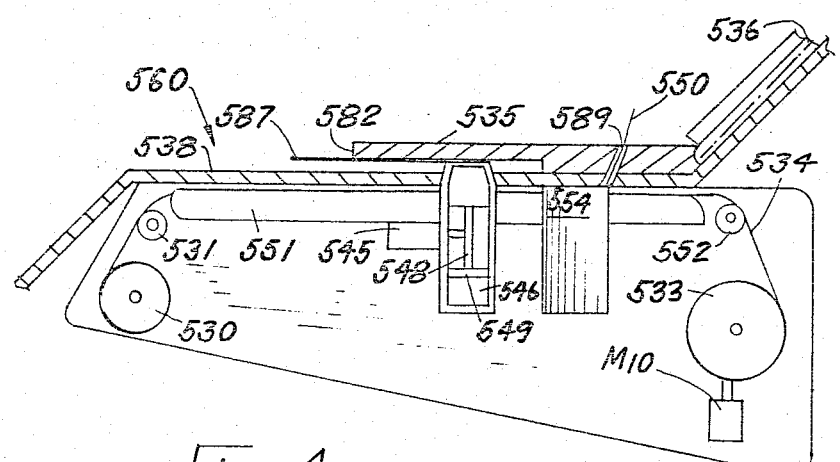
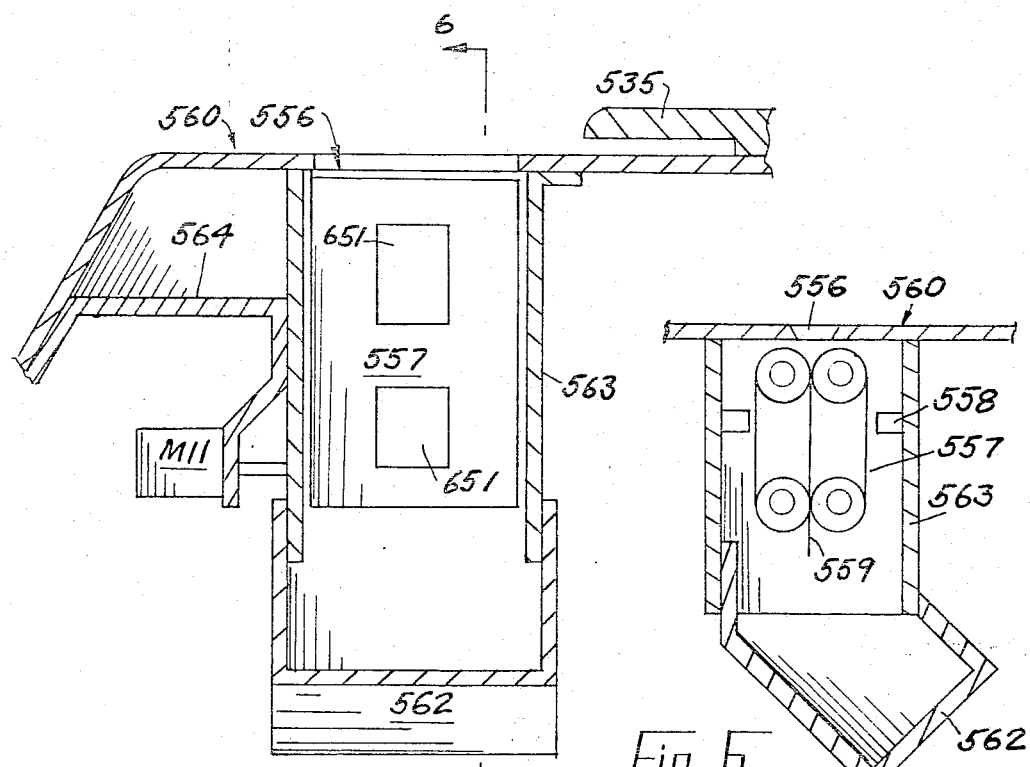

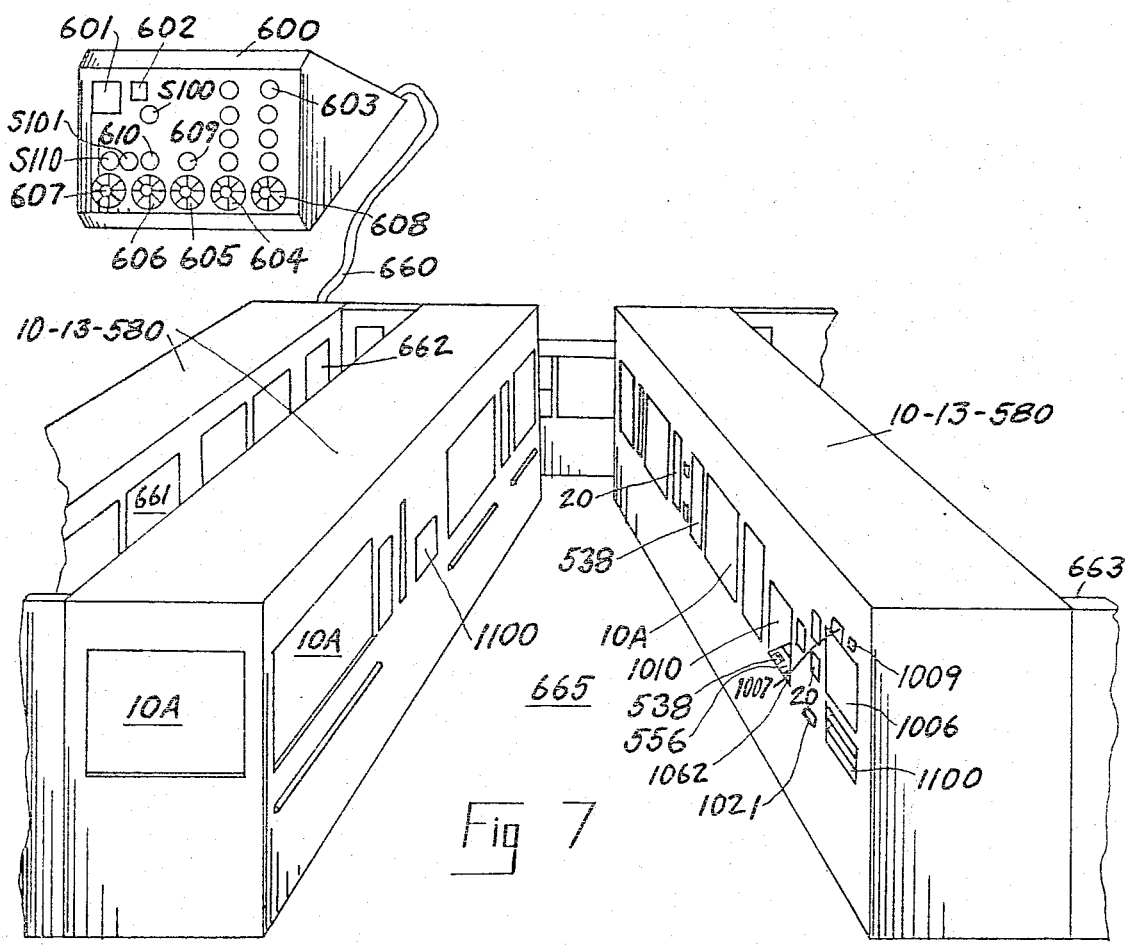
Fig 7
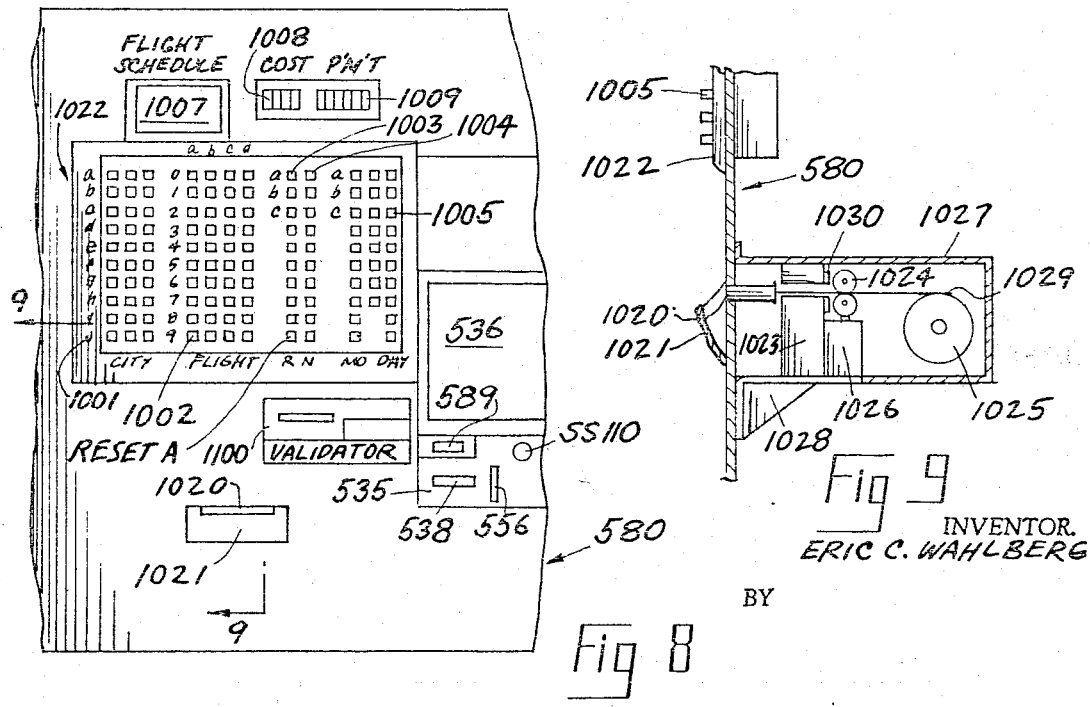
Fig 8
Fig 9
INVENTOR.
ERIC C. WAHLBERG
BY

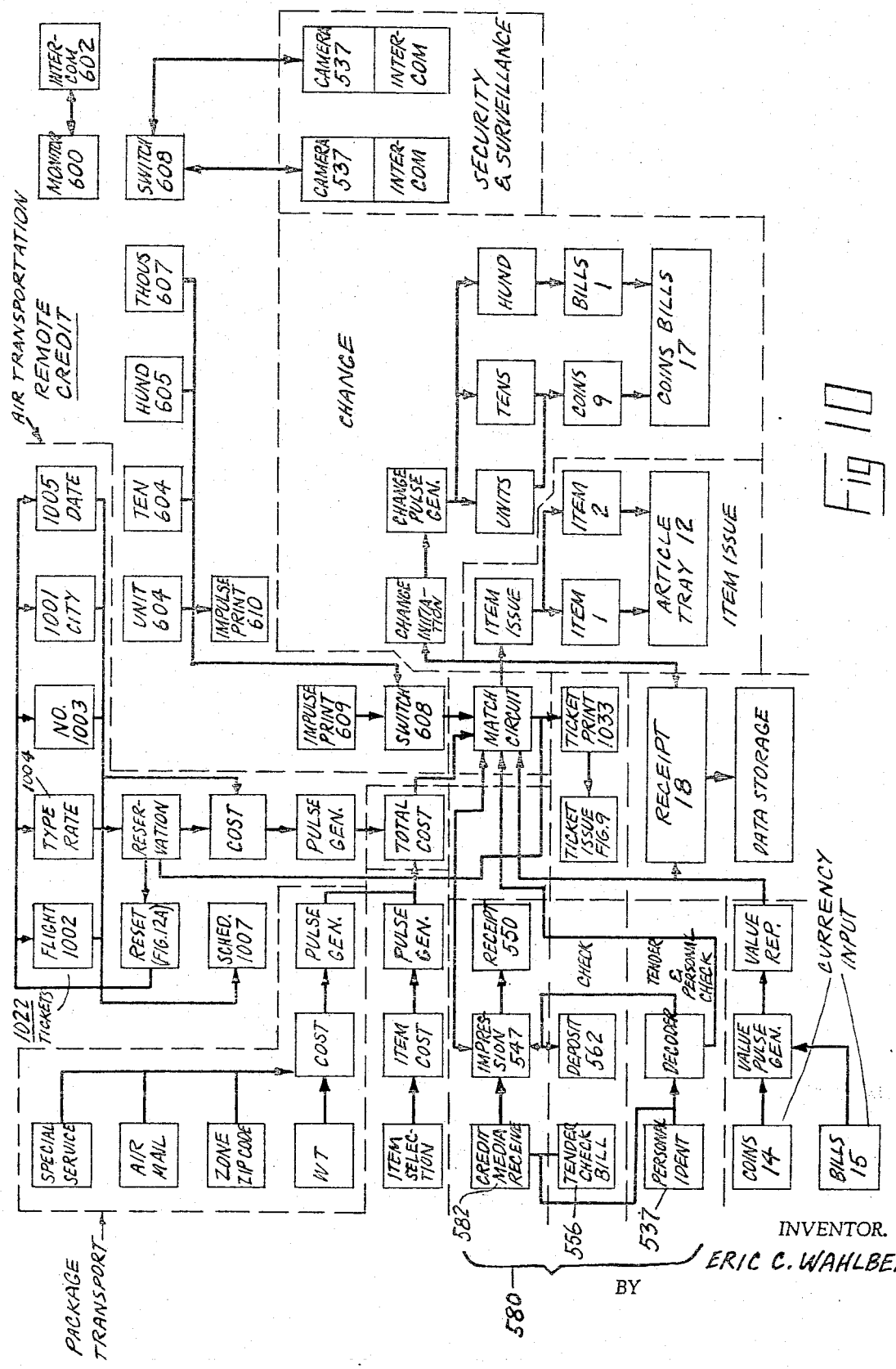

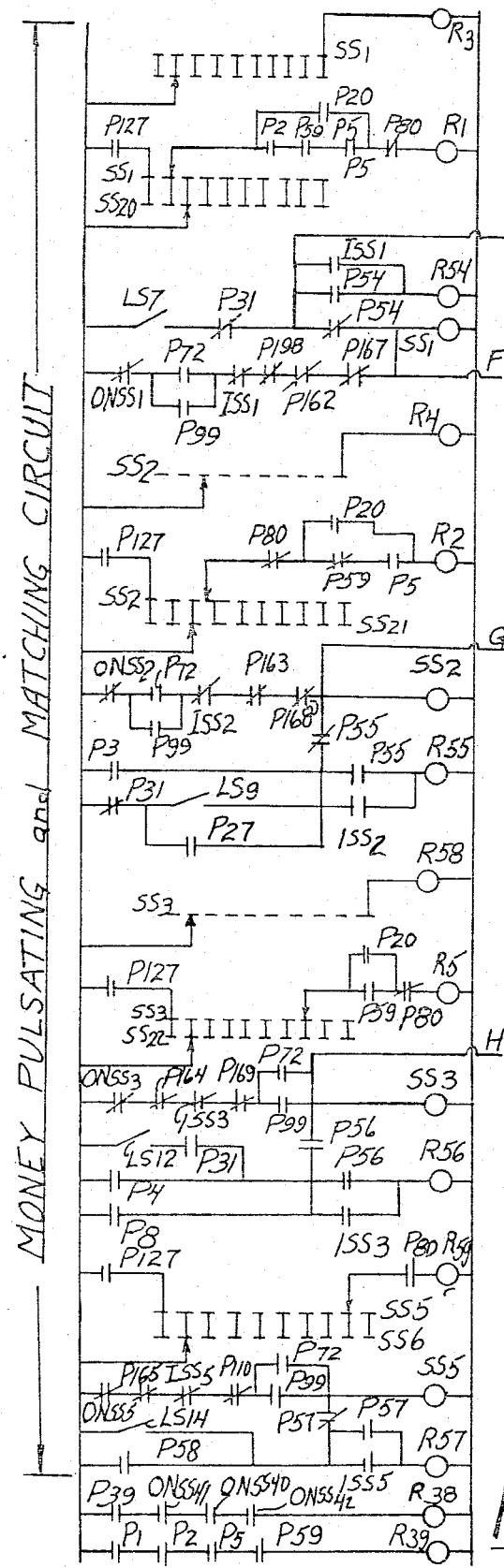
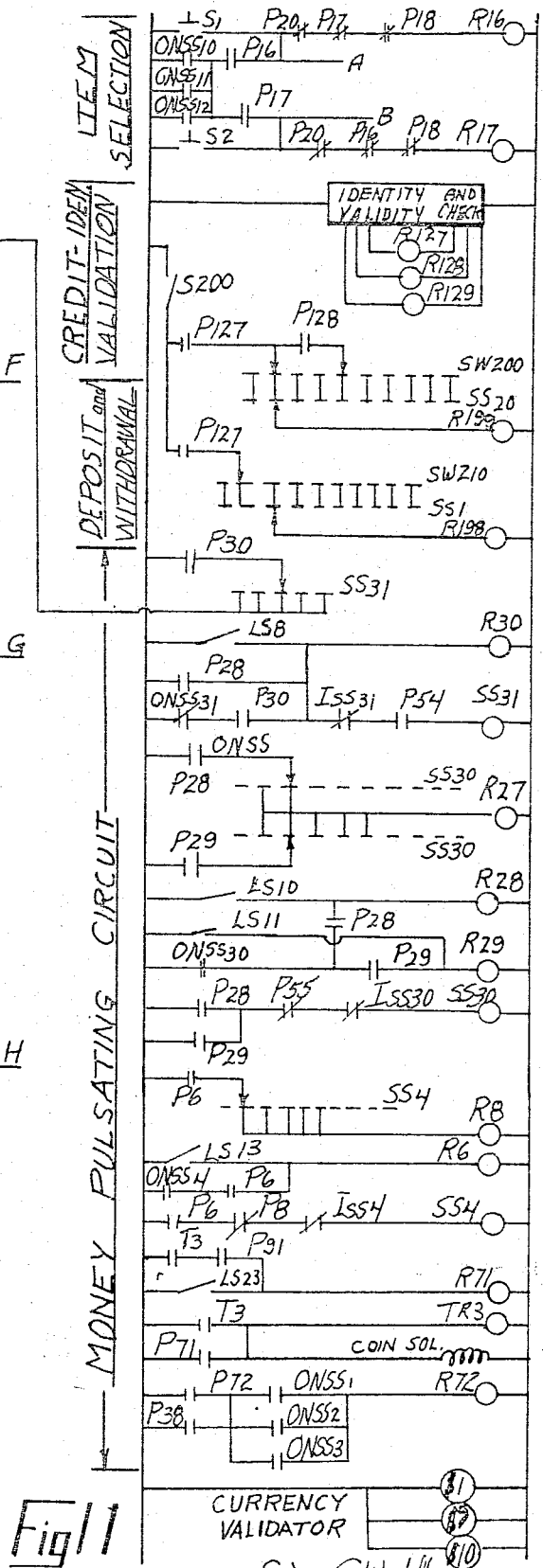
Fig. 1

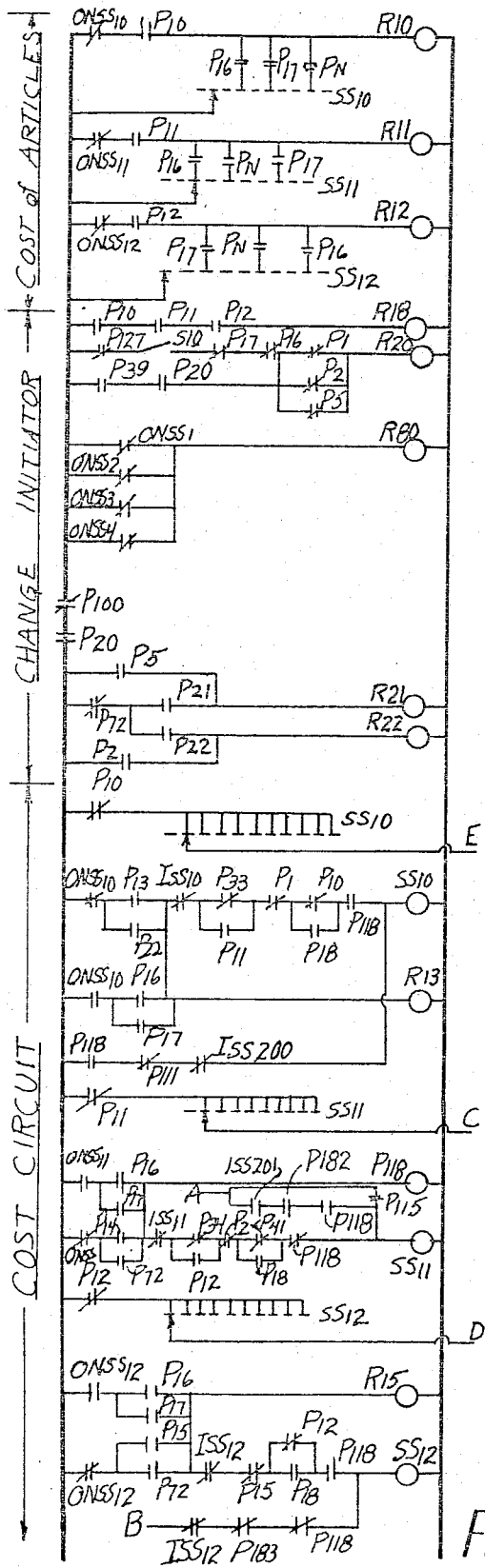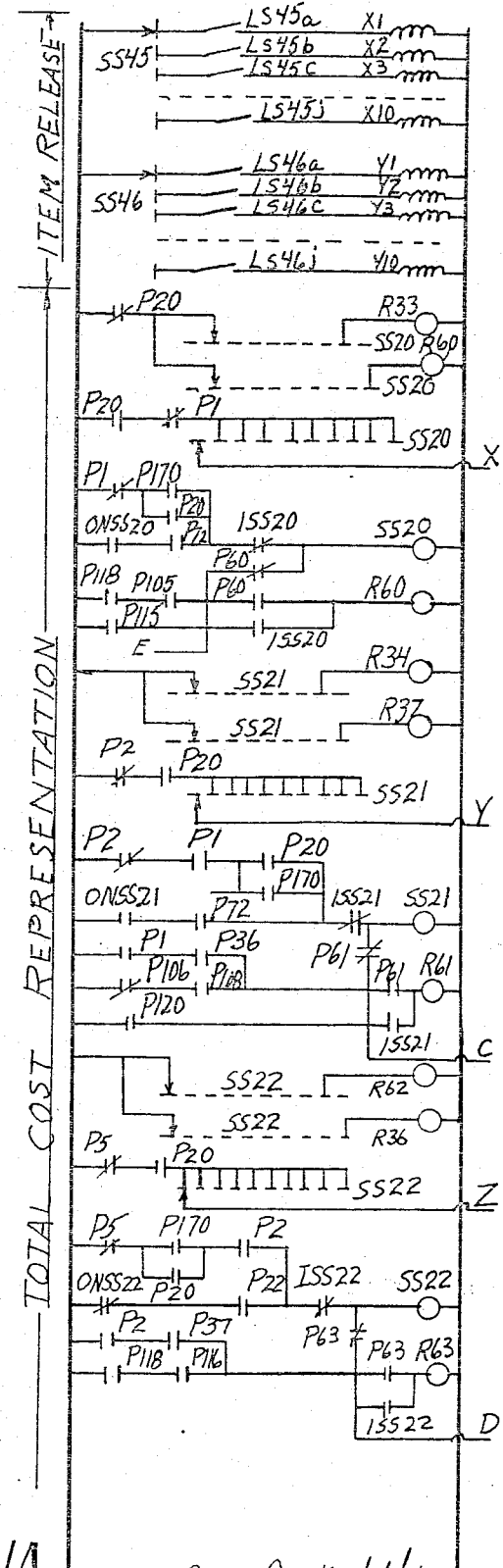
Fig.11A

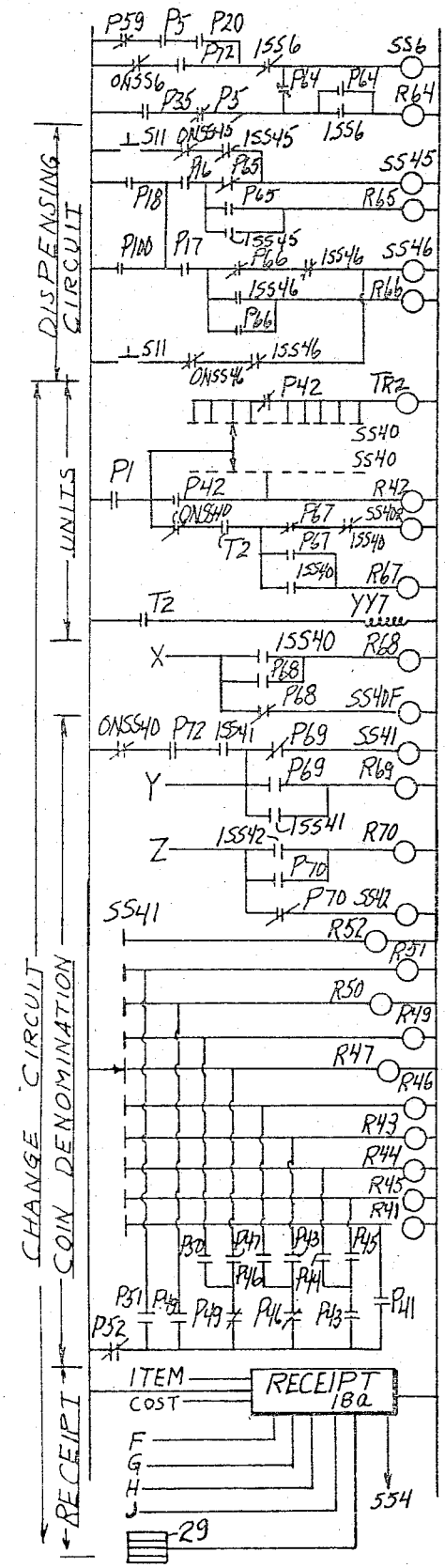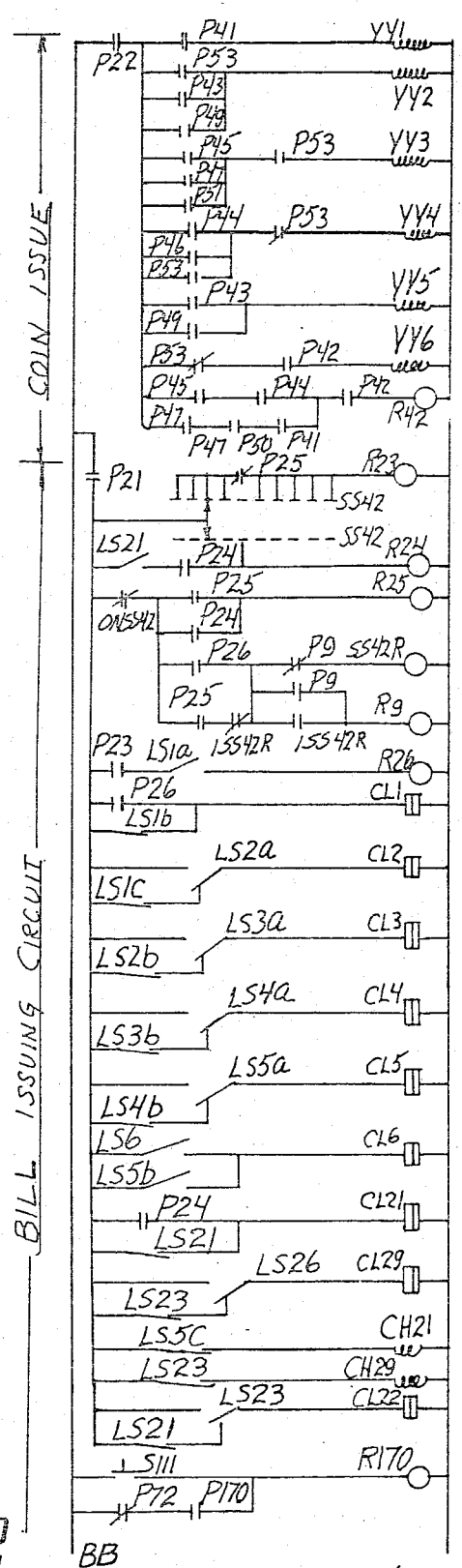
Fig 12

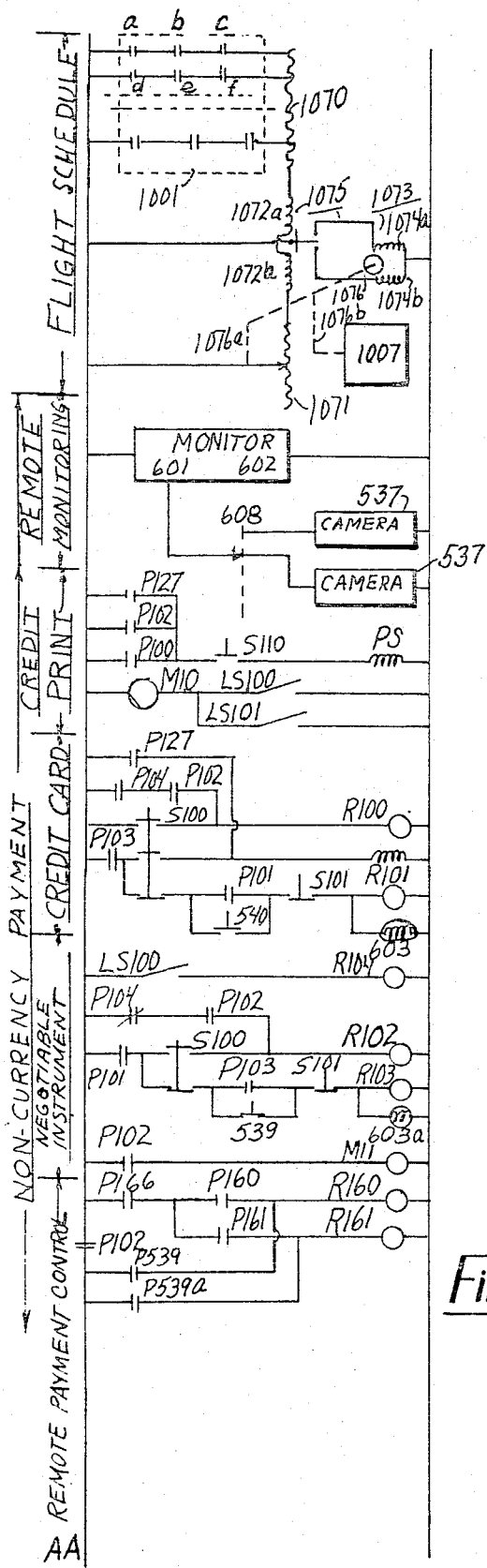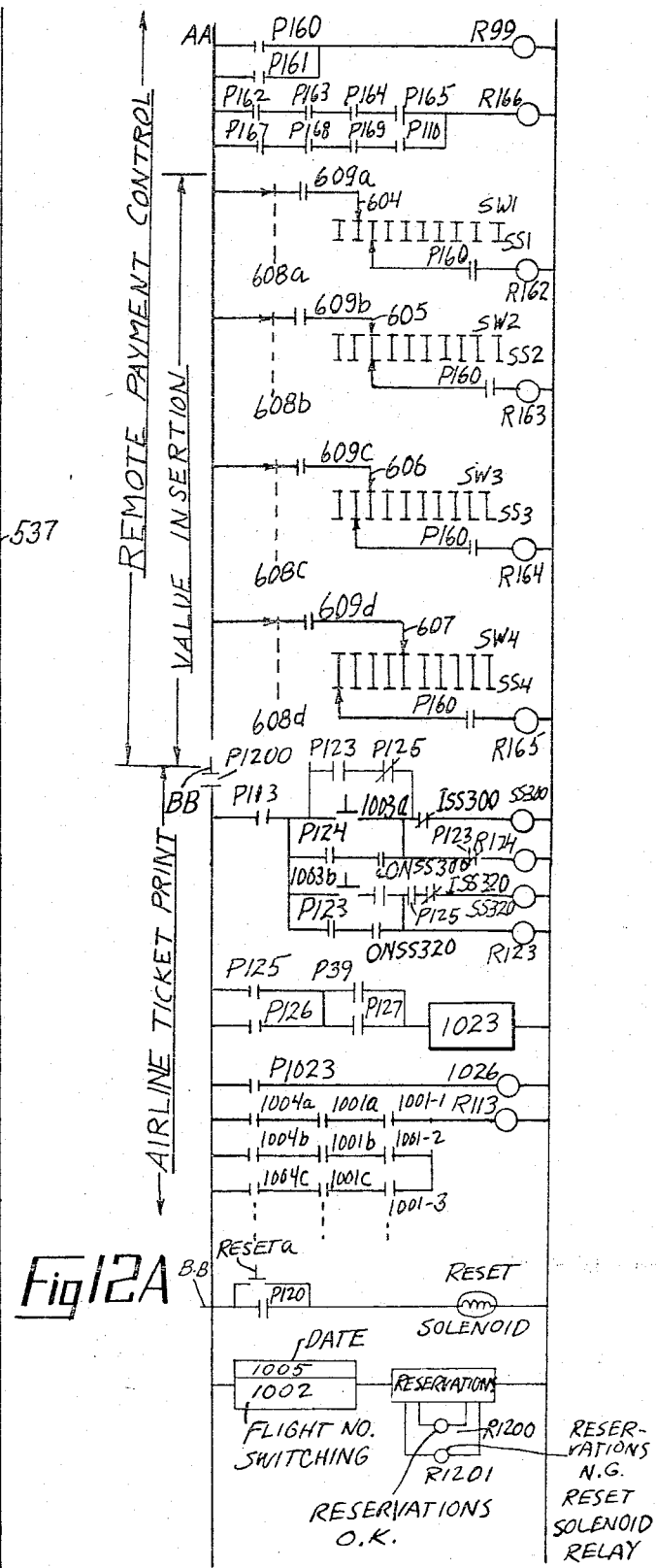
Fig 12A

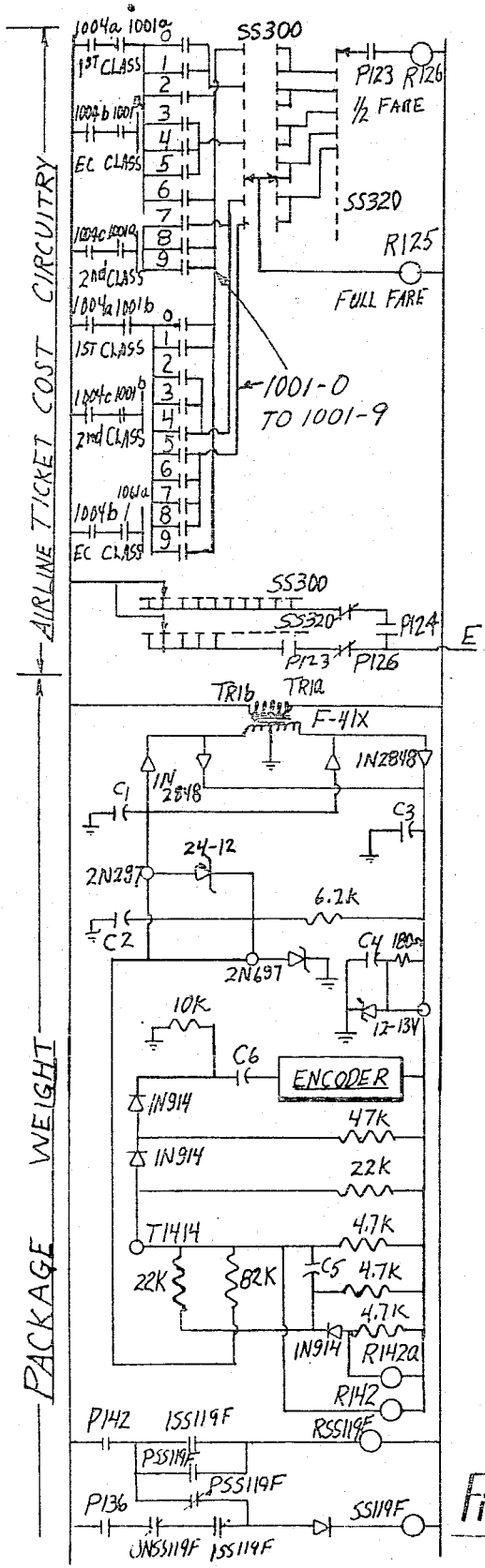
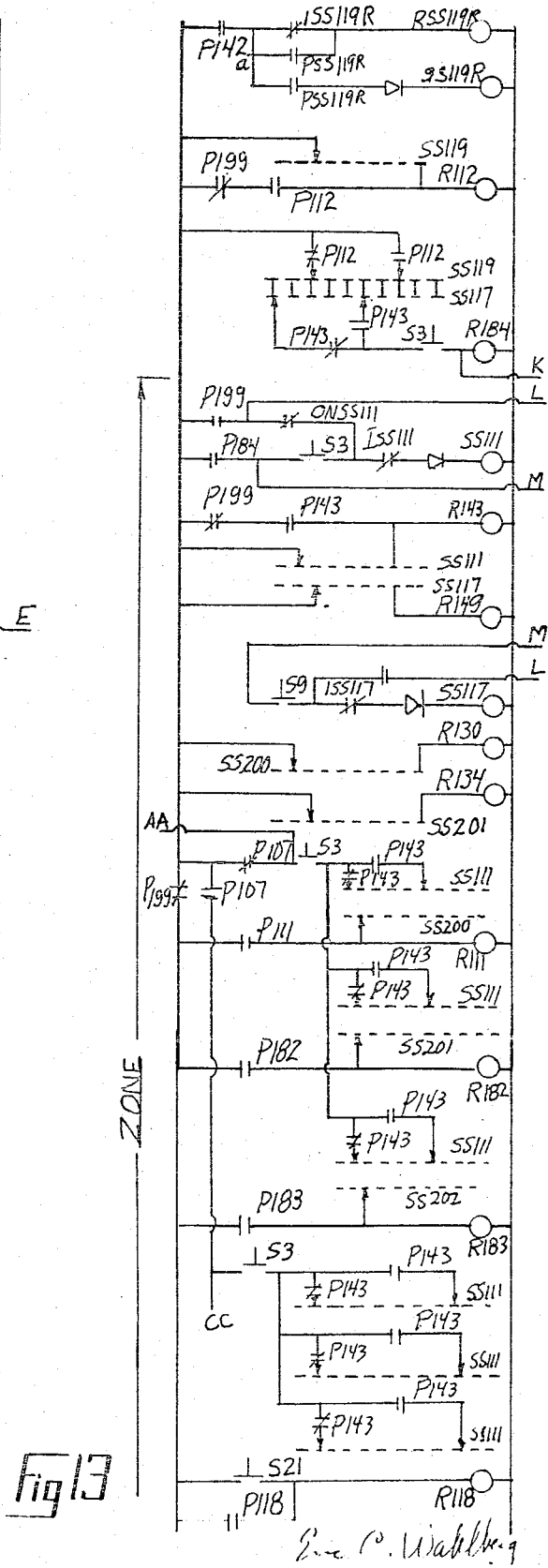
Fig 13

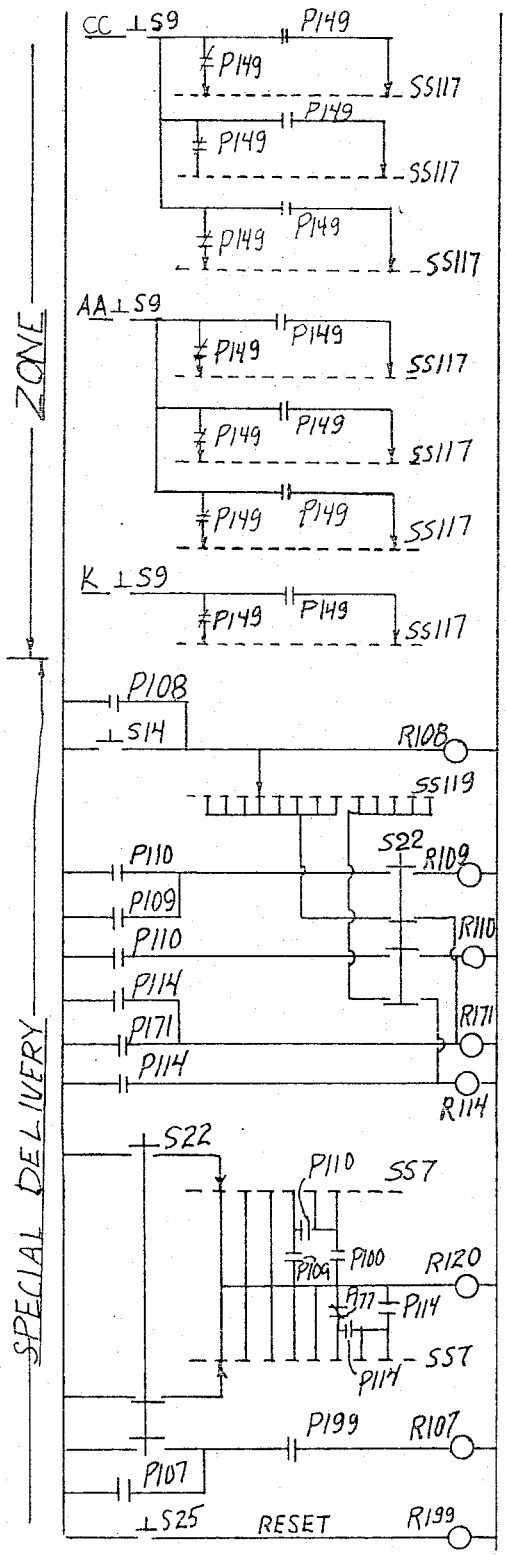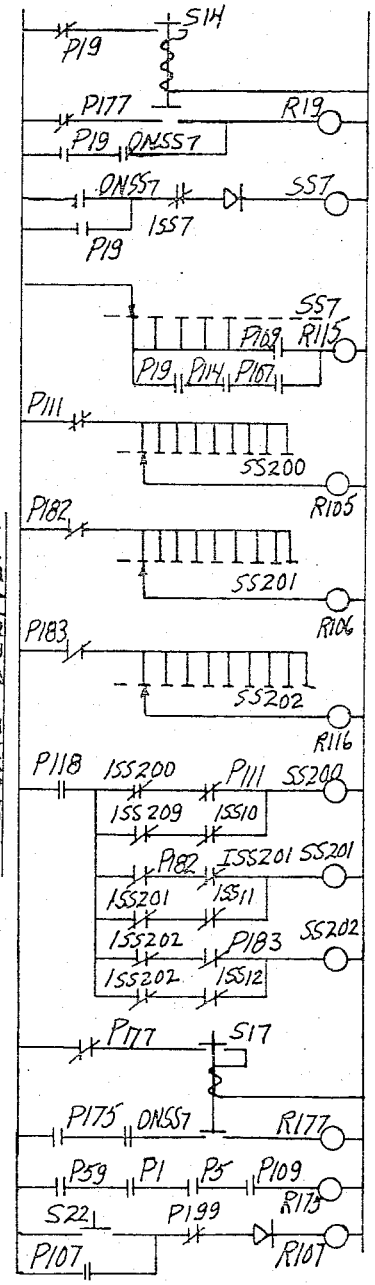
Fig.13A 3,705,384

BUSINESS TRANSACTION APPARATUS

This is a continuation-in-part application of my earlier application Ser. No. 884,620, filed Dec. 12, 1969 now abandoned.

This invention relates to multiple transaction business machines and more particularly, to multiple transaction machines of the vending and remote control automatic transaction type wherein legal tender, credit media and/or negotiable instruments may all be tendered in satisfaction of the cost of one or a plurality of transactions.

In the present world of business transactions, there are a number of media by which payments are made. There is the cash or currency media commonly known as legal tender. There is the negotiable instrument media including money orders, personal checks and the like. There is also the credit media such as the common credit cards now in use by credit groups, gasoline companies and the like.

When legal tender is utilized in payment of transactions conducted through automatic business machines the change making for such legal tender is a definite problem as is the determination of whether such legal tender presented in satisfaction of the cost of the transaction is valid tender.

In negotiable instruments and credit media the problem of identification of the credit media presented or the negotiable instrument presented as well as the identity of the presenting purchaser are facts which must be verified in order to be certain that valid credit media and/or negotiable instruments have been tendered in satisfaction of the total cost of the transaction or transactions being conducted.

Because of the wide variety of commercial instruments which are now acceptable in the tender of payment for business transactions, there is and has been a need in the art of business transaction apparatus for such apparatus having a plurality of classes of business transactions available, such as vending, mailing, banking, ticket issuing, and others, and where within each of these classes a plurality of species of transactions can be made. For example, in the class of vending transactions, a wide variety of selected items may readily be chosen, one or more suitable commercial cost satisfying media presented to the machine, the cost of the total transaction totalized and compared to the value of the commercial media presented and the items subsequently dispensed, with requisite change. By the same token, such a class of transaction as the securing of reservations and tickets for a mode of transportation or the delivery of a package through parcel post or other mailing media could be chosen and the cost thereof totaled and satisfied in the same manner.

The present invention to be hereinafter more fully described illustrates a preferred embodiment wherein a number of classes of transactions are served by a single installation, such classes being those of vending, mailing, banking, transportation, etc. This invention provides either a fully automated method of presenting a receiving payment by the insertion of commercial payment satisfaction media into validating and various value establishing mechanisms or, alternatively, the presentation of commercial payment media to the scrutiny of validating and value establishing personnel which may be located at a location completely remote from the vending and transacting installation.

All of the transactions of the present invention may be monitored remotely for security reasons or for purchaser convenience. Apparatus of the present invention may be installed in each of several widely separated locations and monitored from a remote location in any combination of purposes such as, for example, purchaser identification, special service requests, and in the provision of remote surveillance network to determine the condition of the area in which the transaction apparatus is located.

It is therefore an object of the present invention to provide a new and novel multiple transaction business apparatus for serving a multiplicity of business transaction purposes and which is capable of receiving payment in any acceptable commercial media for completion of a selected transaction or transactions under optimized security conditions.

Another object of the present invention is to provide a new and novel multiple transaction business machine which will accept credit media and/or negotiable instruments tendered in satisfaction of the cost of a transaction or transactions and substantially preclude fraululent usage of said credit media and negotiable instruments.

Another object of the present invention is to provide a new and novel multiple transaction business machine which will accept credit media and/or negotiable instruments tendered in satisfaction of the cost of a transaction or transactions and substantially preclude fraululent usage of said credit media and negotiable instruments; and wherein verification of identity of the purchaser tendering such credit media and/or negotiable instruments is a condition precedent to the completion of a given transaction.

Still another object of the present invention is to provide a new and novel multiple transaction business machine having new and novel remote data link and control means including line of credit and account verification means.

Yet another object of the present invention is to provide a new and novel transportation reservation making, ticket printing and vending device which will accept currency, valid credit media and valid negotiable instruments in tender of satisfaction of the cost of the reservation.

These and other objects of the present invention will become more fully apparent with reference to the following specification and drawings which relate to a preferred embodiment of the invention.

IN THE DRAWINGS

FIG. 1 is a front plane view of a preferred embodiment of the invention;

FIG. 2 is a sectional side elevation of FIG. 1 taken along lines 2—2 showing credit representation receiving means;

FIG. 3 is a sectional plane view of FIG. 1 taken along lines 3—3 thereof illustrating additional details of the credit media and legal tender receiving means of the present invention;

FIG. 4 is a cross section and side elevation taken along lines 4—4 of FIG. 3;

FIG. 5 is a cross section and side elevation taken along lines 5—5 of FIG. 3;

FIG. 6 is a cross section taken along lines 6—6 of FIG. 5;

FIG. 7 is perspective of an installation of the present invention including a remote monitoring and control center as used in conjunction with credit media presentation and validation, negotiable instrument presentation and validation and large domestic and foreign tender handling as well as surveillance handling procedures;

FIG. 8 is a fragmentary front plane view of a transportation ticket vending section of the machine complex of FIG. 7;

FIG. 9 is a cross sectional view taken on line 9—9 of FIG. 8 illustrating the ticket issuing and printing device in schematic form;

FIG. 10 is block diagram of the interrelated components and functional building blocks comprising the present invention;

FIG. 11, 11A, 12, 12A, 13 and 13A are circuit diagrams comprising the calculating money handling, legal tender handling, negotiable instrument handling and credit media handling mechanisms of the present invention.

Referring in detail to the drawings, the bulk of the apparatus and circuitry illustrated in FIGS. 1, 10, 11, 11A, 12, 12A, 13 and 13A are disclosed in applicant's prior U.S. Pat. Nos. 3,397,763 issued Aug. 20, 1968 and 3,451,517 issued June 24, 1969. The disclosures of these patents, together with other patents of applicant, namely, U.S. Pat. 3,415,348 issued Dec. 10, 1968, 3,290,491 issued Dec. 6, 1966, and 3,451,519 issued June 24, 1969, are all incorporated by reference herein in that they illustrate and disclose the money changing, money receiving and totalizing, automatic package handling, item issuing means and circuits illustrated in connection with the present invention.

The present invention is directed to means for correlating the individual inventions contained in the above referenced prior patents of applicant, enlarging upon their versatility of transaction to be conducted, providing them with means for receiving, validating, and otherwise cooroborating credit media, negotiable instruments and the like, together with a new and novel transportation ticket vending and printing means and remote control credit limit indications and monitoring devices for checking the validity of the identity of the purchaser as well as the media tendered by the purchaser in satisfaction of the cost of the transaction or transactions to be performed by the present invention.

Before discussing the drawings in further detail, it is informative at this time to consider the type of credit media contemplated for use in the present invention. One form of such credit media is the popular credit card. On this card is placed the name of the bearer and his account identification either by embossing, punching, magnetically treating or various combinations of these methods to provide identification of the account to which any charge should be made by the vendor. The embossed card is in general use and conventionally serves as a print plate for recording card information onto a record voucher for billing purposes and acknowledgment of receipt of goods or services. Some credit cards may also incorporate on the face thereof a picture of the valid credit card holder or a place for the signature of the holder or both. This provides a method of quick verification of the validity of the holder of the card.

In addition to identification, the credit card may be coded with various information including the limit of credit to be extended to the bearer. This information is read by checking devices which generate signals from the coded information on the card. These signals may be inserted into the apparatus of the present invention as information to be used in the processing of a transaction. This processing may involve the satisfaction of the cost generated by the choice of transactions to be completed. Further, these credit cards may be used in banks for deposits and withdrawls from accounts or payment of negotiable instruments. Again, these cards may serve as payment media for transportation on airlines, railroads and other modes of transportation.

With the foregoing general description of contemplated credit media in mind, the present invention will now be described in more detail.

Referring in detail to FIG. 1, the embodiment of the invention shown therein basically comprises a business transaction machine for conducting four basic classes of business transactions. The first class of transaction is that of vending selected items. The second class of transactions is a means for handling and transporting packages. The third class of transactions is banking. The fourth class of transactions is a ticket printing and vending machine for the selection of travel reservations and consequent printing and issuing of ticketed reservations therefore.

A vending transaction module 10 of the present invention is shown as generally comprising a hinged transparent door section 10A or the like which provides for the display of articles offered for sale and a stationary support station 11 below the display area. A component compartment 12 with an opening 12A therein provides a means for gathering the components purchased as evidenced by the position of the component selector actuators S1, S2, etc., on the module 10. A second module 13 is provided adjacent the module 10 for holding the control circuitry and for receiving domestic currency and issuing change in satisfaction of the selected transaction. The front section of the second module 13 includes coin receptacle means 14 and currency receptacle means 15, comprising the legal tender receiving portion of the module 13, and an indicator 16 which shows the total cost of the purchase. There is also provided a change receptacle 17 including an opening 17A through which change from the transaction can be retrieved by the purchaser. There is further provided a receipt means 18 having an opening 18A therein through which a purchaser may retrieve a receipt for the transaction.

Referring jointly to FIGS. 1 and 2, a credit media and negotiable instrument handling third module 580 is placed adjacent the second module 13 of the invention and comprises a recess in the face thereof with a front sloping surface 560 beginning at the front edge and extending upwardly towards the rear to meet with a second sloping area which slopes more steeply upward and towards the rear, the latter being covered by a reflector 536.

Referring jointly to FIGS. 1–6, the front sloping surface 560 in the third module 580, described in relation to FIGS. 1 and 2, comprises a writing surface having a signature slot 538 therein which overlies a recording tape 534 mounted over a support platen 551 and extending from a supplyroll 530 over idler roll 531 across the platen 551 to idler roller 552 and take-up roller 533, the latter being driven by a motor M10. Tape 534 extends beneath a credit card presentation slot 582 in the credit card receiving means 535, former being adapted to receive a credit card 587. The tape extends from the signature slot 538 beneath the sloping surface and over the platen 551 and extends over a credit card impression head 547 which is adapted to extend through another slot in the writing surface to emboss or impress the tape with the indicia on the credit card 587 when it is in the slot 582 beneath the credit card holding means 535. The tape then passes over a print mechanism 554 to be hereinafter more fully described and thence to the take-up roll 533.

The tape 534 consists of two laminates and just after it passes over the print mechanism 554, the latter recording the nature of the transaction being conducted on the tape, the tape is separated to allow one of its laminates to pass through a receipt slot 589 and appear above the writing surface, whereby, the separated laminate of the tape 534 serves as a credit representation receipt 550 as shown.

The credit card impression head 547 is located in the housing 650 beneath the platen 551 and is controlled by a solenoid 545, schematically shown, which is responsive to the circuitry of FIGS. 11 through 13A and actuated through linkages 548, schematically shown, mounted through cushioned connector means 546 to the housing 650. Solenoid 545 is energized in response to the above mentioned circuits whereby linkages 548 are straightened to provide a predetermined pressure between the bottom of the case 650 and the credit card or other credit media representation means 587 to leave a printed impression on the laminated tape 534 extending over the platen 551 from the supply roller 530.

The advance of the tape 534 is provided by the motor M10 in response to the action of the printing means 554 as is well known in the art. Any of the commercial printing wheels which will respond to electrical signals from circuitry such as that referred to may be used to print information on treated tape in response to output signals. Thus, the print mechanism 554 is hereby disclosed as a conventional tape advance print mechanism responsive to electrical output signals from accounting and control circuitry.

As best shown in FIG. 2, the writing surface containing the signature slot 538 further includes a negotiable instrument and legal tender receiving slot 556, a credit representation switch 540, a legal tender and negotiable instrument switch 539, a reflector 536 overlying the second sloping area of the cabinet section 580 which is used in conjunction with the field of view of a closed circuit television camera 537 located in the cabinet and focused on the reflector 536. One side of the third module 580 has a hinge door 581 thereon to provide access to the negotiable instrument and legal tender receiving hoppers and receipt issuing mechanisms which are all located internally of the cabinet structure.

Adjacent to the legal tender and credit handling third module 580 on the face of the second module 13 is a selection keyboard for the parcel post mailing cost calculation and transaction module of the present invention. This keyboard consists of a plurality of pushbuttons 1010 on which any destination zip code can be registered, pushbuttons 1011 on which the zone of the destination may be registered if the zip code is not known, and pushbuttons 1012 on which the special services is desired to be applied to the transportation of the package may be registered. The above registering means actuate circuits which are shown herein in FIGS. 11–13A and which are described in applicant's prior U.S. Pat. No. 3,451,519, U.S. Pat. No. 3,451,348, and U.S. Pat. No. 3,451,517 already incorporated by reference herein.

The closed circuit television camera 537 is shown in the upper section focused through an opening in the ceiling of the cabinet recess onto the mirror or reflector 536. The camera 537 will, by means of the mirror in the first sloping section, cover a maximum of area for surveillance and identification purposes of the purchaser.

Referring more specifically to FIGS. 5 and 6, the front sloping surface 560 of the third module 580 is shown as including a legal tender and negotiable instrument receiving slot 556 which is in registry with a pair of vertically disposed belts 557 cooperatively driven by a motor M11 and a series of rollers 559. Motor M11 is responsible to the circuitry of FIGS. 12 and 12A. A photocell 558 is located at a distance below the sloping surface 560 of the cabinet module 580 in optical relation with a plurality of registered openings 651 in the belts 557. The belts 557 are adapted to receive legal tender and/or negotiable instruments deposited in the receiving slot 556 and transmit same past the photocell 558, with predetermined portions of the negotiable instruments and legal tender exposed through the slots 651 in the belt to the perusal of the photocell 558. The belts 557, belt rollers 559, photocell 558 and motor M11 are all mounted on a support 563 which in turn is mounted in the third module 580 by a support 564. A hopper 562 is movably mounted to this support 563 beneath the throw of the belts 557 such that legal tender and negotiable instruments deposited into the receiving slot 556 and which later traverse the belts 557 are deposited into the hopper 562 in response to the control circuitry of FIGS. 12 and 12A.

BUSINESS TRANSACTION MACHINE COMPLEX

Referring now to FIG. 7, a business transaction complex with a plurality of business transaction modules will be described for the purpose of illustrating the ultimate capabilities of the present invention.

A plurality of the modular unit combinations 10–13–580 are shown as arranged in a plurality of aisles and rows in the provision of a complex of business transaction machines capable of performing a multitude of business transactions at a common point. As shown, an aisle 665 is provided between the various rows of modules which face inward on both sides of the said aisle. A service aisle 663 is provided between back to back rows of modules and is accessible from a storage area only. Servicing of the multiplicity of modules is accomplished through access doors 661 and 662 which face the service aisle 663.

The various modules 10, 10A, etc., are interconnected with a remote control station 600 by means of an information conduit 660 which contains the wiring for the various circuit connections of the present invention. The front of the service aisle is closed off to customer entrance for purposes of security. Remote stations 600 includes a monitor 601 which is suitably connected to a closed circuit television camera located in each of the modules 10–10A, etc., and optically focused on the reflector 536 and the sloping shelf 560 of each of the cabinet modules 580 as previously described in connection with FIGS. 1 and 2.

Each of these closed circuit television stations is associated with an intercom system generally indicated at 602 which is selectively connected to the remote station 600. Selective control of the business transaction machines 10–10A, etc., is provided at the station 600, although it is not contemplated that the remote station will be necessary in all applications of the invention. It is only a desirable adjunct to the secure operation of a business transaction complex as shown.

When examining, remotely, the validity of both the customer and the credit representation, a control button 610 is provided at the remote station 600 whereby a non-operative constraint is removed from the circuitry of the present invention to be hereinafter more fully described, to permit the dispensing or completion of the business transaction to the purchaser. Furthermore, there is provided a plurality of control dials 604, 605, 606, and 607 at the remote station 600 such that the operator at the remote station can insert into the control circuitry of the present invention an agreed upon credit. A control button 609 is also provided at the remote station 600 to enter the credit setting into the payment evaluating and cost satisfying circuitry of the present invention.

A signal light 603 is also provided at the remote station 600 together with any suitable audible signal, if desired, to indicate to the operator at the remote station that a credit representation has been inserted in the credit receiving slot 582 for purposes of validation. As shown, a plurality of such signal lights representative of a particular business transaction machine in the complex are provided.

TRANSPORTATION, RESERVATION, AND TICKETING APPARATUS

Referring jointly to FIGS. 8 and 9, there is shown a transportation, reservation and ticketing apparatus specifically illustrated as an air line ticket vending purpose machine. This machine is shown as comprising a portion of the cabinet 580 previously described in connection with FIG. 1, said cabinet having an information input keyboard 1022 thereon divided into five groups, namely, a destination city group 1001, a flight number group 1002, a number of passengers group 1003, a type of travel group 1004, and a date of travel group 1005. The date of travel is divided, as required, into month, day and year. There is further shown a flight schedule display screen 1007, cost and payment indicators 1008 and 1009, respectively, a ticket issue slot 1020, and an issued ticket receptacle 1021. This information input keyboard 1022 is shown located immediately adjacent the monitored credit media and negotiable instrument handling means in the cabinet 580, previously described.

The destination city portion 1001 of the keyboard consists of columns of switch keys 1001a * 1001j and 1001–0 * 1001–9 which may be numbered to tie in with cities or may be designated as particular cities. If the keys are numbered there would be provided an index of the cities that are served together with their identification number. These numbers would be inserted into the apparatus according to the keys designated for the cities. If the keys are designated by city names, then they would need only be the pushing of the key of the designated city without correlation to a numbered list. Pressing of the destination keys 1001 will project flight schedules for the desired cities on the screen 1007. Included in the flight schedule are the various flight numbers with their departure and arrival times. The customer can thus choose his flight by registering the number designated for that flight on to the keyboard section 1002. The customer registers the number and type of accommodations by pushing the proper labeled keys and the number of passengers and class category sections of the keyboard 1003 and 1004, respectively. The desired date of the specified flight is registered in the machine by pressing the keys on the date of travel keyboard section 1005.

If the requested reservations are accepted by the reservation center (data storage) to which the information is automatically transmitted, the cost of the accommodations is reflected on the cost indicator 1008. Payment is made in any of the several ways offered by the unit, namely, legal tender, credit media, and/or negotiable instruments. When payment is satisfied, the ticket for the requested reservation is issued from the slot 1020 into the issued ticket receptacle 1021.

Behind the front wall of the cabinet 580, specifically referring now to FIG. 9, the ticket printing assembly cooperating with the ticket issue slot 1020 is schematically shown as comprising a ticket tape roll 1025 from which ticket tape 1029 is passed through a ticket printing mechanism 1023 by means of rollers 1024 driven by a motor 1026. A set of cutting knives 1030 are positioned as well known in the art to cut the ticket tape 1029 at a predetermined point of travel as is also well known in the art. The ticket printing unit 1023 is also conventional in the art. The entire assembly is mounted to the wall of the cabinet 580 by means of a bracket 1028 and a mounting plate 1027.

THE MULTIPLE BUSINESS TRANSACTION SYSTEM

Referring now to FIG. 10, the inner related functions of the mechanisms of FIGS. 1–9 and those other mechanisms incorporated herein by reference to applicant's prior patents will be described with reference to the functional block diagram shown as coordinated with the circuits of FIGS. 11–13A, inclusive.

The prior patents of applicant incorporated by reference herein, a Match Circuit is the central controlling means between the information inputs and the item or transaction completion circuitry. The Match Circuit is a coincidence means which must simultaneously be satisfied regarding the total cost computed, the indentity of a credit card or negotiable instrument, and a personal identity of the purchaser as well as the validation and valuation of the currency inputs to the machine. Upon satisfaction of all of these quantities by equating them in a coincidence gate, the various outputs of the business transaction device are actuated, namely, the Item Issue circuit, the Change Initiation circuit and the Ticket Print circuit.

The Currency Input and Package Transport circuits as well as the Change Circuit and the Item Issue circuits are all disclosed in applicant's prior art patents which have been incorporated by reference herein. Briefly, the Package Transport circuit includes a Special Service input, an Airmail Selection input, a Zone or Zip Code input and a Package Weight input all of which feed into a common Cost determining circuit the output of which is directed to a cost Pulse Generator circuit and thence into a common Total Cost circuit from whence an output representative of the total cost of the package transport for one or more packages is directed into an input of the Match Circuit to determine the issuance of a postage stamp or printed ticket representation of paid postage. The representation of paid postage or postage stamp may be issued either through the Ticket Print circuit such as the air line ticket print 1023 and its ticket issue slot 1021 (FIG. 9) or it may be issued through the Item Issue circuit which is also energized by the output of the Match Circuit.

The Item Selection means is also shown in applicant's prior patent and briefly consists of an Item Selection circuit, generating an input to energize an item Cost circuit providing a cost signal for each item selected by means of energizing a cost Pulse Generator which in turn feeds its output into the common Total Cost determining circuit and thence into the input of the Match Circuit to determine the satisfaction of the total cost of the transaction as will be hereinafter more fully described.

The third module 580 for receiving credit media, foreign currency and negotiable instruments as well as the determination of personal identity is shown as including the following:

A credit card receiving means 582 is operatively connected to the credit card impression head 547 which in turn is operatively related to the receipt issuing means 550.

The impression head device 547 has an output which is directly connected to one input of a Decoder network, the latter having additional inputs from the negotiable instrument receiving means 556 and the credit card receiving means 582 as well as the personal identification of the purchaser circuit 537. The personal identification circuit bears the numeral 537 which heretofore designated the closed circuit television camera 537 and the cabinet 580. It is, however, not limited to this specific element and may be other types of devices which automatically monitor a given physical characteristic of the purchaser to validate his personal identity.

The foreign currency and negotiable instrument receiving device 556 has a physical output to a deposit device 562 for receiving the tendered foreign currency and negotiable instruments. The deposit means 562, as previously described in connection with FIGS. 5 and 6, provides a validation output along with that from the credit card impression means 547 to an input of the Decoder device.

The Decoder circuit is a coincidence device, which, when it has satisfied the authenticity of both the personal identity of the purchaser as well as the validity of the credit media, negotiable instrument or foreign currency presented, provides an output to the Match Circuit.

The Match Circuit further has a control input via the switch 608 from the remote station 600 as well as a Total Cost input from the Item Selection, Package Transport and Air Transportation circuits, all of these having a common Total Cost determining means connected therewith, to create various coincidence constraints upon satisfaction of which the business transaction desired may be completed.

The Air Transportation circuit of the block diagram of FIG. 10 is shown as including the selection key board 1022 comprised of the destination circuit 1001, flight circuit 1002, a number of passengers circuit 1003, type of transportation and rate circuit 1004 and date desired 1005, all of which have a common output to a Reservation bank which in turn has three outputs, a first output to a Cost determining circuit, a second output to a Ticket Print circuit and a third output to a Reset circuit having a common output connection to all of the key board circuits 1022 to reset the same upon the completion of a business transaction for the reservation of travel accomodations and the issuance of tickets therefor. The flight schedule display circuit 1007 is also shown as connected to the common outputs of the key board circuits 1022.

The key board circuits 1022 also have a common output to the Cost circuit which, in coincidence with the output from the Reservation circuit, will totalize and determine the cost of the travel accomodations upon the indication by the Reservation circuit that the desired reservations are available. This Cost circuit directs its output to a cost Pulse Generator which in turn generates a cost output for the transaction which is entered in the common Total Cost circuit of the business transaction device of the present invention. The Total Cost circuit as previously described has a single output upon which the cost of any and all of these transactions is transmitted to the Match Circuit where it is compared with the other inputs representing the value of commercial media presented in satisfaction of payment for the transaction desired.

The Remote Credit circuit of the present invention is shown as including the remote credit determining units 604 through 607 respectively, which operate an impulse print recording device 610 at the remote station 600 such that the value of a given transaction and the identity thereof are recorded at the remote station. Furthermore, an impulse print circuit 609 controlled by the remote station 600 is also provided to energize a switch 608 adjacent to and providing an input to the Match Circuit such that disabling or enabling signals can be provided to the Match Circuit from the remote station 600.

Any of the decoding devices in present use for decoding printed, magnetized or punched credit representations may be used in the Decoder circuit of FIG. 10 for both credit media and coded checks. Such a device is presently manufactured by General Electric under the name of "Tradar." Others are based on other scientific principles for reading coded devices. Another device called "Varied Data" produced by Electronic Computor Systems Inc. of Miami Springs, Fla., can also be used. This unit is adapted to receive a punched credit card. Through this unit the credit card data is transmitted to a time sharing facility to determine the status of credit whether the card is currently valid and any number of other validation checks and receive an answer from a computor. This is basically the intended function of the remote station 600, namely, to receive and supply information profided by the Decoder at a central location to thereby compute the validity of presented credit and other commercial media. The resulting validation signal is used as an input to the Match Circuit of FIG. 10 for use in completing the transaction.

The Personal Identification circuit of FIG. 10 can comprise any number of known devices which use such things as signature matching, separate code card insertion by a card holder, voice identification or other physical characteristics of the purchaser. The determination of validity is also used to actuate an input of the match circuit to establish the necessary of coincidence of identity, validity and amount to complete the selected transaction.

As previously described in connection with FIG. 7, the monitor 610 and intercom 602 is selectively switched by means of the remote switch 608, shown as a rotary selector type switch, to the closed circuit television cameras 537 or other personal identification validating means located in each of the sections of the apparatus. Further the rotary switch 608 also acts as a routing switch for all of the other functions of the remote station 600 to selectively connect it into operation with any particular business transaction station or module being utilized.

Another unit which may be utilized for the determination of the validity of a personal identity of a purchaser is manufactured by the Cibany Manufacturing Corporation of Greenwich, Connecticut. This unit identifies and verifies a person by means of information stored on an identification card. In this device the person inserts his card and his hand into a viewing area of the device. The machine checks the hand physically to determine certain vital measurements. The stored information stored on the card regarding these measurements is read by the device and compared to the physical measurements made by the device on the inserted hand of the purchaser. If this information is in coincidence, a signal is generated which indicates that the person inserting the card is the same person as that described on the stored information of the card. Therefore, it can readily be seen that a remote closed circuit television station is not the sole contemplated element of the present invention to effect varification of personal identity by the Personal Identity circuit of FIG. 10.

OPERATION OF THE PRESENT INVENTION

Referring jointly to FIGS. 1 through 10 and to those portions of FIGS. 11 through 13A which contain the following circuits: Deposit and Withdrawal circuit, Credit Identification and Validation circuit, Item Selection circuit, Air Line Ticket Cost circuit, Item Currency Payment circuits (Legal Tender circuit, Credit Card circuit, Credit Print circuit, Remote Monitoring circuit,) Flight Schedule circuit, Remote Payment Control circuit, Value Insertion circuit and Air Line Ticket Print circuit, the operation of the multiple transaction business machine of the present invention will now be described.

A customer approaches the apparatus of the present invention and notes the various business transaction purposes for which the apparatus is adapted. The customer sees a display cabinet having the wares displayed that are offered for sale at a given price per item; a panel having a key board used for servicing a postal post package; a coin receiving slot; a bill receiving mechanism; cost payment indicator; article and change receiving receptacle; a credit and negotiable instrument area with mirror and camera or other personal identification mechanism; and a cubical having a scale for weighing parcel post packages for ultimate transport. All of these various business transaction functions have been described herein or incorporated by reference herein by way of applicant's prior patents.

The customer may choose any of the commodities or services offered by the business transaction device of the present invention and pay the cost thereof by the insertion of currency, credit media, negotiable instruments and other commercial media for decoding and/or approval at the specific location of the desired business transaction to be completed. When the payment has been completed, the commodities purchased or the evidence of the contracted services in the form of a receipt or the like are deposited in the proper receptacles of the apparatus together with any change due for overpayment. Therefore, all of the transactions offered by the multiple transaction business machine of the present invention can be completed merely by following the instructions that would necessarily be a part of the device.

Since the tender of currency, i.e., legal tender in the form of bills and coin, have already been incorporated by reference herein through applicant's prior patents, no further description of operation will be made herein for this function of the present invention.

TENDER OF PAYMENT BY CREDIT MEDIA AND/OR NEGOTIABLE INSTRUMENT

Should the customer desire to use the credit media representation such as a credit card instead of cash to satisfy the cost of the selected business transaction, this credit media such as the credit card 587 of FIG. 4, would be inserted in the credit media receiving slot 582 on the writing surface 560 of the module 580, as shown in FIGS. 3 and 4. The pushbutton 540 of FIGS. 1 and 3 is then depressed to signal the remote operator station 600 shown in FIGS. 10 and 7, to alert the operator of the remote station, via the signal light 603, that a representation of credit media has been offered to satisfy the amount of cost of the selected transaction. The operator at the station 600 turns the multi-position selector switch 608 to connect the apparatus into the closed circuit television camera 537 and the intercom circuits 602 as well as into the computational circuits of FIG. 10 and other conventional data banks. The purchaser, as well as his credit representation, then appears on a remote station video screen 601 via the closed circuit camera 537 and reflector 536 at the module 580. The customer then may be asked to supply identification which is placed just below the credit representation and appears on the remote screen 601 together with his countenance. If the identification appears satisfactory and the credit acceptable the customer is asked to sign his name and write whatever else is necessary to identify himself in the signature slot 538 in the writing surface 560 of the module 580. Signature and other information may be then verified through observation of the screen 601 by the operator at the remote station 600.

When the operator has determined the validity of both the customer and the credit representation tendered of satisfaction of the cost of the transaction, the operator may energize the button 610 at the remote station 600. The operator may also insert into the circuitry of FIG. 12A the agreed amount of credit by turning the dials 604 through 607 to reflect that amount of credit and the upon pushing of the button 609, the switches SS1, SS2, SS3 and SS5 in this circuit and in the money pulsating and matching circuit of FIG. 11 are caused to step to match the settings of the corresponding switches SW1, SW2, SW3, and SW4 which were initially set by the dials 604 through 607. If, meanwhile, the operator has pushed the button 610, the solenoid 545 in the credit media embossing head 547 is energized which causes the credit representation to impart its information onto the double laminated tape 530 which has already been impressed with the signature of the purchaser. When the total of the purchase has been calculated by the total cost circuit, the printing mechanism 554 which has been monitored by the computer to reflect the continuous summing of costs, prints the total on a tape 530. The tape is then advanced by the motor M10 with one laminate 550 thereof being issued through the receipt slot 589 and the other laminates being wound on the roller 533 to be used for billing and office records. Any of the various printing assemblies which accept data may be used in conjunction with the computer circuitry. Such printers may include those provided by Pressin Company or those used in the cash register industry. The apparatus is designed to be cleared without insertion of money with the completion of the printing operation.

In the case of live monitoring of the business transaction apparatus of the present invention from the remote station 600, if the operator should not approve the credit or the validity of the holder, he would ask the customer to remove the credit representation proffered and and to pay the purchases in cash.

When a treated or punched credit representation is used there are a number of associated reading devices which may be used to determine the validity of the credit without resorting to the remote station operator. These have been described hereinbefore.

To identify the holder of the credit representation and the validity of the credit card, the affirmative outputs of one of each of these devices is used to constrain the apparatus to proceed with the transaction without reversion to a remote operator when automatic physical characteristic identification devices such as those previously described herein are utilized. Such peripheral type equipment and its connections into the subject apparatus can easily be adapted to the circuitry of FIGS. 11 through 13A to transfer all of the information to the circuitry as is well known to those skilled in the art. The information could trigger a relay to connect the setting of the matching relays R1, R2, R59 in the Money Pulsating and Matching circuit of FIG. 11 to a maximum amount represented by the credit representation. The switch contacts involved would connect the contacts associated with the values represented by the credit media to the above mentioned match relays. The customer could be allowed to set into the apparatus the amount desired in the payment provided it is less than the maximum allowable credit rating of the card, by energizing dial circuitry like that of the remote station 600, which would now not be removed from the machine and would place the credit limit dials 604 through 607 at the disposal of the customer, through the insertion of the credit representation and turning the dials to the desired amount.

In other words, all of the features of the remote station, subject to an automatic personal identification validating constraint, could be placed at the situs of the business transaction complex such as shown in FIG. 7 if provided with fully automatic identification, precluding the need for remote stations 600.

Should the customer desire to pay by negotiable instruments, such instrument would be placed on the shelf or writing surface 560 as previously described in connection with FIGS. 1, 2, 5, and 6 and the button 539 would be pushed to indicate to the operator of the remote station 600 that a customer had a negotiable instrument to be tendered in payment of the cost of the transaction. The customer and the negotiable instrument may both be viewed on the remote screen 601 and the operator will then note the type and value of the instrument. An identification may be required which may be placed along side the instrument. The operator examines both and then requests the customer to make a signature in the signature slot 538 and enter the negotiable instrument proffered into the negotiable instrument slot 556 on the writing surface 560. The operator then pushes the button 609 which energizes the motor M11 in FIGS. 5 and 6 to cause the belt 557 to pull negotiable instrument into the apparatus and place the same in hamper 562, during which operation, the operator has set the dials 604 through 607 to reflect the amount of value represented by the negotiable instrument into the remote payment circuitry of FIG. 12A. Should the instrument be a piece of foreign currency as opposed to the acceptable national legal tender, the exchange rate would be taken into account in establishing the value to be imposed on the remote payment control circuit and value insertion network in FIG. 12A. Pushing the button 609 also causes the switches SS1, SS2, SS3 and SS5 to step to match the settings of the corresponding switches SW1 through SW4 which were previously positioned by the dials 604 through 607 respectively. If the cost of the items purchased is less than the value determined by the setting of the dials, change for the difference will be determined by the computer circuitry. The totals of the transaction are printed on a tape 530 by the print mechanism 564 as previously described in connection with the presentation of credit media.

Should the negotiable instrument be one which is coded by treating or punching or the like, it would be handled as described above for treated or coated credit representations and the identity of the customer could also be automatically determined as hereinbefore described.

By virtue of the fact that a foreign exchange rate can be inserted into the value insertion circuits of the remote payment network of FIG. 12A, that this invention may be used in any country using that country's currency especially when the above described acceptance procedures are adhered to. The value of the currency will be translated into values by turning the dials 604–607 in accordance with the determined translation monetary ratios which are usable in the apparatus.

For example, the dials 604 through 607 may be Canadian, British, German, Japanese or any other currency value of a so-called foreign country. The switches may be hooked up for the base or domestic country, such as the United States, into which it should be related. Since the exchange ratio is the same for all denominations of currency of a particular country relative, say, to the United States, turning of the dials 604–607 to the foreign countries value of negotiable instrument or the legal tender will automatically relate that value into its value in terms of the base country on the switches. It is well known that a dial can be attached to a mechanism and turned to the inscribed value and the mechanism will reflect the movement associated with the dial calibration. It is also well known that the dial can be recalibrated in a different ratio. The movement of the mechanism will still reflect the movement of the old dial but the position of the mechanism for the new dial calibration will be different from the old one.

Therefore, when the dials 604–607 are set to reflect the amount of value represented by the instrument, (pounds, francs, marks, yen, etc.) the exchange rate would be taken into account in establishing its values. So, therefore, switches SW1–SW4 positioned by the dials 604–607 will indicate the foreign value in the basic countries currency to be represented as inputs into the stepping switches SS1 through SS5 in the Money Pulsating and Matching circuits of FIG. 11.

Referring further to FIGS. 10, 7 and 12A, the actuation of the button 540 on the console of the module 580 of the present invention for payment by credit media causes the bulb 603 to light at the remote station 600 energizing relay R101 to energize and lock itself into the circuit of FIG. 12A by closing the switch P101 and locking out the currency evaluating circuit of FIG. 12. A switch S100 is provided which when operated subsequent to the actuation of the push button 540 causes the relay R100 to energize and lock itself into the circuit. The credit card impression solenoid 545 is also energized and thus causes the credit card information to be recorded on the receipt tape 534. The motion of the print solenoid towards the extreme print position causes the limit switch LS100 to close thus causing the motor M10 to run. The rotation of the motor M10 causes the switch LS101 to close by means of a cam shaft and to keep the motor running until the proper predetermined amount of the tape is advanced, which will give the customer the receipt with the cost information, credit card imprint and validation information and signature on it. The closing of the switch LS100 also causes a relay R104 to energize and thereby open the circuit of the switch S100 by opening the contact P104. This results in a reset of the credit representation circuit of FIG. 12A.

When negotiable instruments are presented as opposed to credit media, said instruments comprising either money orders, foreign currency or personal checks and the like, the button 539 is pushed on the writing panel 560 of the module 580 causing the bulb 603 to light on a remote control panel 600 and causing, in circuit of FIG. 12A, the relay R103 to energize, lock itself into the circuitry by closing its contacts P103 and lock out the credit representation circuit of FIG. 12A by opening that one of its contacts P103 in the circuit of the switch 540. A switch S100 is provided at the remote station 600 which is to be actuated after the push button 539 on the console 580 has been energized thereby causing the relay R103 and a corresponding indicator bulb 603A in the circuit of FIG. 12A to be energized. This further causes energization of the relay R102 which is locked into the negotiable instrument circuit by the closing of its contacts P102. The print solenoid circuit may then be actuated by pressing of the switch button S110 at the remote station 600, all shown jointly by FIGS. 7 and 12A as comprising a series combination of the relay contacts P102, closed push button switch S110, and print solenoid PS shown in the credit print circuit of FIG. 12A. The print solenoid PS is an integral part of the print mechanism 554 previously described in connection with FIG. 2.

Referring further to FIG. 12A, the actuation of the print solenoid PS will cause the switch LS100 to close and energize the tape advance motor M10. The starting of the motor M10 will cause the switch LS101 to close and keep the motor M10 running. Since all of the relay contacts P102 in the circuit of FIG. 12A are actuated by energization of the relay R102, the switch contact P102 in the bus bar of the remote payment control and value insertion networks of FIG. 12A is also closed, allowing the value of the negotiable instrument or legal tender presented (foreign currency), as determined by the remote station operator though the closed television circuit cameras 537 and intercom system previously described, to be entered into the computing circuits of FIG. 10 by turning of the dials 604 through 607. The computer as stated herein refers generally to the total cost and match circuits of FIG. 10. Referring to the value insertion circuit of FIG. 12A the value of these instruments or foreign currency or the like will be registered on the contacts of the switches associated with the switch dials SW1, SW2, SW3, SW4. Since the push button 539 has already been energized, the relay 160 in the remote payment control network has been locked in by the closing of relay contacts P160 and P166. When the relay R102 is energized through the pushing of the push button S100, the relay contacts P102 were all actuated thereby causing the relay R99 in the Remote Payment control network to energize through the closed relay contacts P160 and P102 in the bus bar as above described. The energization of the relay R99 causes the stepping switches SS1, SS2, SS3 and SS5 in the Value Insertion network of FIG. 12A to be pulsed to a point coinciding with the contacts previously positioned by the switches SW1, SW2, SW3 and SW4 at the remote station 600. As each of these separate switches SS1–SS5 matches the corresponding dial settings SW1–SW4, corresponding relays R102–R105 are energized. When all of these relays are energized the relay R106 is energized thereby causing its contact P106 to open, thereby deenergizing the relay R160. Thus, the value of the legal tender or negotiable instruments is now represented on the contacts of the stepping switches SS1–SS5.

Once the validation and value of the credit media and negotiable instruments tendered in satisfaction of the cost of the desired transaction have been entered into the machine, the operation for the selection of articles and the item issue circuitry operate in the same way as previously described in applicant's prior patents incorporated by reference herein. Furthermore, the machine of the present invention may be utilized by superimposing currency payments onto credit payments and all of this will be calculated and taken into consideration by the Total Cost and Match Circuits of the invention.

In the foregoing, all of these remote stations stepping switches SS1–SS5 have corresponding stepping switches located in the Money Pulsating and Matching circuit and the Deposit and Withdrawal circuits, and Credit Identification and Validation circuits shown in FIG. 11. In this way, the Remote Station can be operated to constrain the local computer circuitry at the business transaction machine situs to the data provided from the Remote Station.

When a coded or treated credit card or negotiable instrument is used as a means of initiating or tendering payment in satisfaction of the costs to be incurred in the desired business transaction, the automatic identification and reading devices previously described herein can be interconnected into the circuitry of FIGS. 11 through 13A of the present invention to provide automatic operation, including that of personal identity verification as well as validation of the credit media and negotiable instruments. In each type of automatic device there is a signal generated which indicates either the acceptance or rejection of the physical data of the purchaser should it correspond with recorded data in an associated memory bank of the device. The acceptance signal is used to actuate relays (not shown) which will close the previously described contacts controlling the stepper switches SS1 through SS5 shown in FIG. 11. These switches would then indicate to the Total Cost and Match Circuits of FIG. 10 the maximum value for which purchases or transactions may be made. For a credit card, these signals would also open the CHANGE CIRCUIT to avoid issuing change for the difference between item costs and credit established by the signal and the match circuit. All other operations subsequent to this automatic detection and identification of personal identity and credit validity would be accomplished as previously described herein.

Thus, a credit card validity can be checked and the resulting signal used to either insert a maximum value into the Match Circuit of FIG. 10 and constrain a release of those items which have been choosen without issuing any change even though the maximum amount of the credit rating on the credit media or credit card has not been reached. Additionally, if there is unlimited credit available, a signal would be generated to allow full usage of the business transaction apparatus without limit of credit by causing the opening of the stepping switches SS20, SS21, SS22 and SS6 in the Total Cost Representation circuit of FIG. 11A.

THE BANKING FUNCTION OF THE INVENTION

Reference is now made to FIG. 11 to the Deposit and Withdrawal and the Credit Identification and Validation circuits shown therein which are for the purpose of banking transactions such as making withdrawals from an account, depositing in an account, or if cashing of a negotiable instrument such as a check is requested by the customer. A switch S200 is provided which is closed by the customer and an identification card is inserted into the card checking and reading device which may be included in the console 580 as hereinbefore described. Also, the switch S200 may comprise a push button similar to the push buttons 539 and 540 shown on the console 580 in FIGS. 1 and 3.

If the credit check circuit provides an affirmative signal the relay R127 thereof is energized to close the circuit to the withdrawal and deposit circuits through the relay contacts T127. The customer then turns the dials SW200 through SW204 which sets the contacts thereof to respective contacts of stepper switches SS20, SS21, SS22 and SS6 to represent the proper amount of money involved in the withdrawal; or the dials SW210 through SW214 are set to constrain the stepper switches SS1, SS2, SS3 and SS5 to represent the proper amount of money involved in the deposit. The rest of the procedure is conducted through the Total Cost, Change Issue, Receipt Issue and Match Circuits of FIG. 10 as previously described for other types of transactions. For the deposit of large bills and checks, the closed circuit television cameras 537 are used as hereinbefore described to verify the validity and value of the instruments. A tape receipt is issued to the customer and the information entered into the computer circuitry of FIG. 10 such that the customer's account may be immediately updated.

In these transactions as in the case of the previously described business transactions, remote attendance or automatic personal identification mechanisms can be incorporated in the console 580 to cooperate with the deposit, withdrawal and credit identification and validation circuits for banking purposes.

As in the Credit Identity and Validity circuit in cooperation with the Banking Deposit and Withdrawal circuits of FIG. 11, the relay R127 closes its relay contacts P127 in FIG. 12A in the Credit Card Credit Print and Negotiable Instrument circuits for the same purpose as just described, namely, that of identifying and validating the credit media and/or negotiable instrument media which has been tendered in satisfaction of payment of the desired transaction.

In all of the foregoing description, the switches for setting the valuation of the desired transaction, namely, the switches with the SW designation, may appear on the console 580 as well as at the Remote Station 600 if such is associated with the business transaction device being utilized. These banks of switches designated with the SW prefix are not specifically shown as being on the consoles but in fact are placed thereon in a bank for use by the customers.

THE TICKET VENDING FUNCTION OF THE INVENTION

Referring to FIGS. 8, 9, 10, 12A and 13, the operation of the airline ticket vending apparatus of the present invention will now be described.

As previously described herein, the necessary items of information for the vending of an airline ticket and reservation are the destination, class of travel and category of fare. Other specific items are the flight number and date of departure. The input panel 1022 of FIG. 8 and the group of input function buttons 1001 through 1005 as well as the flight schedule display 1007 have already been described in connection with FIG. 8. The information inputs on the input panel 1022 are automatically checked with the reservation circuit of FIG. 10 in a manner well known to those of ordinary skill in the art and, therefore, a description of this particular function is not included herein. Affirmation of the reservation circuit of FIG. 10 permits the apparatus of the present invention to proceed with the calculation and consummation of the ticket transaction culminating in the issuance of the ticket on payment of the cost thereof in a manner previously described for satisfaction of the costs through the business apparatus of the present invention. In other words, the the reservation circuit of FIG. 10 places mutual constraints on the Match Circuit and Ticket Print circuit 1023 of FIG. 10 to preclude ticket issue through the Ticket issue circuit in the event that no reservation, as requested through the input panel 1022, is available.

Referring now to FIGS. 12A and 13, the Destination Circuit 1001 and the Type of accomodations and Rate circuit 1004 of FIG. 10 is shown as including three basic designations of type and rate, namely, first class, economy class (designated in FIG. 13 as "EC Class") and second class. Each particular type and rate class, utilizing the first class designation as an example, consists of a set of ten switches designated as 1001–0 through 1001–9, (not shown for the sake of simplicity) wherein each switch in this particular switch set serves a further set of ten switches designated as 0 through 9 respectively. One contact of each of the switches 00 through 09 and the switches 0 through 9, respectively, is connected to a bus bar through a series combination of a Type and Rate contact 1004 and a Destination contact 1001. The remaining contact of each of the switches 1001–0 through 1001–9 are connected to one side of a stepping switch complex SS 300. Each of the remaining type and rate classes, namely, the EC Class and the second class are associated with similar multiple contacts switch complexes as the 1001–0 1001–9 switch banks, in like manner to that shown for the first class selections.

The interconnection of each of the contacts of the switches 1001–0 through 1001–9 with the contacts of the stepping switch SS300 are effected to represent units of cost for a particular destination city to be represented upon the switches 1001–0 through 1001–9 as constrained by the Destination circuit 1001 on the selection board 1022. Therefore, the unit cost of a full fare for the destination desired in the class of travel desired can be represented on the contacts of the stepping switches SS300. A bank of these stepping switches SS300 is used as a pulser for transferring the cost of a given travel accomodation and reservation transaction to the total cost stepper switch SS20 in the Total Cost Representation circuit of FIG. 11A via the common connection E and relay contacts P60.

At this time it should be noted that only two of the columns in the switch key grouping of the destination circuit 1001 have been labeled, the lefthand vertical column shown in FIG. 8 comprising the 1001A through 1001J group and the righthand column comprising the set of 10 switch contacts 1001–0 through 1001–9. The additional columns of buttons inbetween these two columns are really exemplary of the fact the entire alphabet may be designated for these switch keys in order to provide a greater selection of cities by the apparatus of the present invention.

When the relay contacts P124 are closed on the full face pulse circuit of stepping switch SS300 (FIG. 13) and in the stepping switch SS300 circuit of FIG. 12A as controlled by full fare button 1003A (FIG. 12A) and the relay R124 of the Number of Passengers circuit 1003, the stepper switches SS300 will step and generate pulses through the line E to the cost computing relay SS20 until the provision of the stepper switch SS300 matches the contacts which are connected to the line through the 1001 and 1004 Destination and Type-Rate switches previously described. This matching of contact positions causes the relay R125 to be energized and opens the relay contacts P125 in the stepping switch SS300 bank. Thus, the stepping switch SS20 and the Total Cost Representation circuit of FIG. 11A is stepped the equivalent of the total unit cost of the desired travel ticket.

Furthermore, the stepping switches SS300 are provided with output contacts of like position to those connected to the Destination and Type-Rate switch inputs which are in turn connected to a second set of stepping switches SS320 in such a fashion as to represent, for example, one-half the cost of a full fare. This is exemplary of certain special rate considerations commonly found on common carriers such as airlines and the like, whereby the energization of a half fare button 1003B (FIG. 12A) in the Number of Passengers input circuit 1003, will energize relay R123 and close the relay contact P123 in the circuit of the stepping switch SS320 in the Airline Ticket Cost Circuit of FIG. 13 and reflect the cost information through the relay contacts P123 and common connection E, whereby, in the Airline Ticket Print circuit of FIG. 12A, the second stepping switches SS320 are caused to step until a match is reached with the connections with first stepping switches SS300 in the manner previously described for the first switches SS300. Here again, the pulses generated by the stepping of the SS320 switches are fed through the common connection E to the cost computing stepping switch SS20 in the Total Cost Representation circuit of FIG. 11A. When the matching point of the stepping switch contacts is reached, the relay R126 is energized to open the relay contact P126 and thereby stop the stepping action of the second stepping switches SS320. At this point in time, the cost of the half fare or other special rate, depending upon the ratio set between the first and second stepping switch banks SS300 and SS320, has been transferred to the total cost computing stepping switch SS20 in the Total Cost Representation circuit of FIG. 11A.

The Airline Ticket Print circuit (FIG. 12A) includes the ticket print circuit 1023, the ticket tape advance means 1026 and a plurality of interconnected switching networks including switches representative of the destination and the type-rates circuits generally shown as 1001a, b, c, etc., 1001–1, 2, 3, etc., and 1004a, b, c, etc., to effect the predesignated information to be imparted, by printing, onto the ticket tape 1029 of FIG. 9. As shown, the airline ticket print circuit includes relay contacts P125 from the full fare relay R125 and relay contacts P126 from the half fare relays (or other special rate designation) relays R126 which energizes the ticket punch circuit 1023 across the bus bars shown in FIG. 12A upon energization of either of the full fare or half fare relays. The switching network schematically illustrated as controlling the ticket tape advance device 1026 and the relay R113 are merely exemplary of known printer control circuits of the prior art and no further description thereof is deemed necessary.

Referring to the flight schedule circuit of FIG. 12A, the closing of the contacts 1004a, 1001a, and 1001-1 in series represents that a choice of a city and a class of transportation has been completed on the selection panel 1022 of FIG. 8. The relay R113 is energized and a current value is established in a resistor 1070 and a coil 1072a opposing the current in a resistor 1071 and a coil 1072b. If the two currents are different, the movable contact of a switch 1075 will be attracted by the stronger force to make contact with its corresponding fixed contact thereby causing energization of one of the coils 1074a or 1074b of a driving motor 1073 to thereby cause the motor 1073 to drive a movable contact of the resistor 1071 to a position in which the current flow through the resistor 1070 is matched by the current flow through the resistor 1071. The movable contact is driven through means of a shaft 1076a, connected to a main output shaft 1076 of the motor 1073. As the shaft 1076a moves the movable contact arm of the resistor 1071, the schedule to be displayed upon the flight schedule viewing panel or screen 1007 is changed for the benefit of the customer by means of a second shaft 1076b drivably connected to the output shaft 1076 of the positioning motor 1073.

From the flights listed on the schedule display screen 1007 under the city choosen, a flight is choosen and a flight number is switched into the flight selection circuit 1002 by pressing the proper switch keys on the flight selection panel 1022 and the desired date of the flight as selected by pressing the proper switch keys in the date of travel selector circuit 1005 on the selection panel 1022.

This causes a search to be made of the reservation memory circuit (See FIGS. 10 and 12A) to determine whether or not seat vacancies exist on that flight for that day. If there is a seat vacant, the memory causes a relay R1200 to be energized by a signal from the reservation memory module and thereby causes closing of associated relay contacts P1200 in the Airline Ticket Print Circuit of FIG. 12A. The choice of rate, such as full or half fare, is then entered into the circuit of the present invention by selective energizations of the switch keys in the rate and number of passengers circuits 1003 and 1004. This causes the stepping switch SS300 (see FIG. 12A) to step through contacts P1200, ISS300, P124, ONSS300 until such time as the stepping switch SS300 reaches a position at which the switch contacts ONSS300 are open. Pulsing is produced from stepping switch SS300 bank only until the relay R125 is energized and its corresponding contact P125 in the circuit between the stepping switch SS21 and the common connection E in the Total Cost Representation circuit, is opened.

If first class is not desired, then the switch 1004a is not actuated and instead, the switch keys 1004b together with the city of destination switches 1001a and one of the set of ten switches 1001-0 through 1001-9 are actuated which in turn are connected to the contacts of the stepper switch SS300 to calculate the cost of the ticket.

Tourist or second class is also selected in a similar manner by actuating the button or switch key 1004c in the destination circuit 1004 and again actuating the switch keys 1001 as previously described.

All of these rate selections may be repeated for a given city by merely changing the initial city of destination contacts from 1001a to 1001b or 1001c, etc., and thereafter tying the selected destination switch to the stepping switch SS300 through the 1001-0 through 1001-9 contacts as described above.

Once the total cost payments of the foregoing inputs have been computed in the total cost circuit of FIGS. 10 and 11A, payment for the desired travel reservations and ticket issuance can be effected in any of the various modes previously described for the present invention, namely, cash, credit media and/or negotiable instrument.

It is to be clearly understood that the airline ticket issuance circuit described in connection with FIGS. 10, 12A and 13 is not to be limited to this form of ticket issuance but is merely exemplary of the type of transaction that can be effected. Therefore, tickets for sports events, theaters and other reserved ticketing for events and accommodations can be readily made by the same type of circuit.

In the foregoing description of the present invention, it is readily seen that the present invention provides a new and novel multi-purpose business transaction apparatus which holds the number of attending personnel at the situs of the transaction devices to an optimized minimum and, in the case of automated individual identification devices, precludes the need for attending personnel.

Furthermore, the present invention provides a means whereby business operations may be maintained 24 hours a day for both the convenience of the public and the businessman and wherein little or no personal danger from hold-ups and the like is present.

A further advantage of the present invention is that by virtue of its automation it provides immediate updated accounting for any and all transactions by its capabilities of tying into centralized or remote data processing centers for recording all of the necessary data to identify each and every transaction as it is effected.

The business transaction devices of the present invention are also extremely flexible in that they permit, where desirable, personal observation of the purchaser for various business purposes.

It can also be readily seen from the foregoing description that the present invention provides a means by which a wide variety of business transactions may be consumated without the need for attending personnel and that such transactions may be completed by tendering in satisfaction of payment for the transaction, credit media, negotiable instruments and cash, both domestic and foreign. Therefore, such diverse business transactions as ordinary merchandizing, postal handling, banking, currency exchange, credit extension, payments on account, ticket purchasing, etc., may all be conducted by one complex of apparatus at a common situs with the attendant advantages of reduced personnel, customer convenience, flexibility and the utmost in security together with attendant reduction in cost of each and every operation and a potential increase in good will.

What is claimed:

1. In a multiple transaction business machine, including means for selecting a transaction or a plurality of transactions, totaling the cost of such transactions and determining the value of payment tendered in satisfaction of the cost of said transactions, payment evaluating means receiving credit media and negotiable instruments from a purchaser in tender of satisfaction of the cost of said transactions comprising:

first validating means scanning said credit media and negotiable instruments and generating a first information signal identifying a selected characteristic thereof;

analyzing means receiving said information signal and including first confirmation means generating a first validation signal as a function of the authenticity of said credit media and negotiable instruments;

second validating means scanning a selected characteristic of said purchaser, generating a second information signal as a function thereof and transmitting same to said analyzing means;

said analyzing means including second confirmation means generating a second validation signal as a function of the authenticity of identity of said purchaser; and coincidence means receiving and responsive to said first and second validation signals, the cost of said transactions, and the value of payment tendered in satisfaction thereof, selectively constraining said business machine to complete said transaction upon the coincident occurrence of a predetermined relationship of said validation signals, said cost and said value of payment tendered.

2. The invention defined in claim 1, wherein said payment evaluating means further includes means receiving legal tender in satisfaction of the said cost of said transactions, validating said legal tender, computing the value thereof and generating and transmitting a value signal therefor to said coincidence means.

3. The invention defined in claim 1, wherein said business machine further includes, in combination with said payment evaluating means, transaction designating means comprising:

selection means designating at least one class of transaction to be effected and at least one species of transaction within each said class;

rate means, responsive to said selection means, generating a cost signal for each said selected transaction; and cost totalizing means receiving and responsive to said cost signals, generating a total cost signal for all of the transactions selected and transmitting said total cost signal to said coincidence means.

4. The invention defined in claim 3, wherein said payment evaluating means further includes means receiving legal tender in satisfaction of the said cost of said transactions, validating said legal tender, computing the value thereof and generating and transmitting a value signal therefor to said coincidence means.

5. The invention defined in claim 1, wherein said business transaction machine includes means for making transportation reservations, and printing and vending tickets in confirmation thereof, comprising:

first selecting means generating a selection signals representative of a selected mode, a particular class and a desired one of the scheduled availability of said selected mode and class of transportation;

correlating means receiving said selection signals and comparing same to prior made reservations to determine availability of said selection and generating availability signals indicative thereof;

cost means responsive to said availability and selection signals generating a transaction cost signal when said reservation selection is available and transmitting said cost signal to said coincidence means; and printing means, mutually constrained by said coincidence means and said correlating means, printing and vending a ticket in confirmation of said selected reservation when the latter is available and the payment tendered through said payment evaluating means is in full satisfaction of said transaction.

6. The invention defined in claim 5, wherein said payment evaluating means further includes means receiving legal tender in satisfaction of the said cost of said transactions, validating said legal tender, computing the value thereof and generating and transmitting a value signal therefor to said coincidence means.

7. The invention defined in claim 1, wherein said second validating means comprises a viewing station remote from said business machine;

viewing means at said business machine for viewing said purchaser, interconnected with and transmitting data to said viewing station; and remote control means at said viewing station, selectively constraining said analyzing means to validate the identity of said purchaser.

8. The invention defined in claim 1, wherein said payment evaluating means further includes means receiving legal tender in satisfaction of the said cost of said transactions, validating said legal tender, computing the value thereof and generating and transmitting a value signal therefor to said coincidence means; and wherein said second validating means comprises:

a viewing station remote from said business machine;

viewing means at said business machine for viewing said purchaser, interconnected with and transmitting data to said viewing station; and remote control means at said viewing station, selectively constraining said analyzing means to validate the identity of said purchaser.

9. The invention defined in claim 1, wherein said business machine further includes, in combination with said payment evaluating means, transaction designating means comprising:

selection means designating at least one class of transaction to be effected and at least one species of transaction within each said class;

rate means, responsive to said selection means, generating a cost signal for each said selected transaction; and cost totalizing means receiving and responsive to said cost signals, generating a total cost signal for all of the transactions selected and transmitting said total cost signal to said coincidence means; and wherein said second validating means comprises:

a viewing station remote from said business machine;

viewing means at said business machine for viewing said purchaser, interconnected with and transmitting data to said viewing station; and remote control means at said viewing station, selectively constraining said analyzing means to validate the identity of said purchaser.

10. The invention defined in claim 9, wherein said payment evaluating means further includes means receiving legal tender in satisfaction of the said cost of said transactions, validating said legal tender, computing the value thereof and generating and transmitting a value signal therefor to said coincidence means.

11. The invention defined in claim 1, wherein said business transaction machine includes means for making transportation reservations, and printing and vending tickets in confirmation thereof, comprising:

first selecting means generating a selection signal representative of a selected mode, a particular class and a desired one of the scheduled availability of said selected mode and class of transportation;

correlating means receiving said selection signals and comparing same to prior made reservations to determine availability of said selection and generating availability signals indicative thereof;

cost means responsive to said availability and selection signals generating a transaction cost signal when said reservations selection is available and transmitting said cost signal to said coincidence means; and printing means, mutually constrained by said coincidence means and said correlating means, printing and vending a ticket in confirmation of said selected reservation when the latter is available and the payment tendered through said payment evaluating means is in full satisfaction of said transaction;

wherein said second validating means comprises:

a viewing station remote from said business machine;

viewing means at said business machine for viewing said purchaser, interconnected with and transmitting data to said viewing station; and remote control means at said viewing station, selectively constraining said analyzing means to validate the identity of said purchaser.

12. The invention defined in claim 11, wherein said payment evaluating means further includes means receiving legal tender in satisfaction of the said cost of said transactions, validating said legal tender, computing the value thereof and generating and transmitting a value signal therefor to said coincidence means.

13. The invention defined in claim 1, wherein said business machine further includes, in combination with said payment evaluating means, recording means effecting recordation of each business transaction of said business machine.

14. The invention defined in claim 1, wherein said business machine further includes, in combination with said payment evaluating means, recording means effecting recordation of each business transaction on said business machine; and receipt means, acting in concert with said recording means, issuing a receipt of each said transaction to said purchaser in response to tender of payment in satisfaction of the total cost thereof.

* * * * *